United States Patent [19]

Christodoulou et al.

[11] Patent Number: 4,751,048

[45] Date of Patent: * Jun. 14, 1988

[54] PROCESS FOR FORMING METAL-SECOND PHASE COMPOSITES AND PRODUCT THEREOF

[75] Inventors: Leontios Christodoulou, Baltimore; Dennis C. Nagle, Ellicott City; John M. Brupbacher, Baltimore, all of Md.

[73] Assignee: Martin Marietta Corporation, Bethesda, Md.

[*] Notice: The portion of the term of this patent subsequent to Dec. 1, 2004 has been disclaimed.

[21] Appl. No.: 927,032

[22] Filed: Nov. 5, 1986

Related U.S. Application Data

[63] Continuation-in-part of Ser. No. 662,928, Oct. 19, 1984, abandoned.

[51] Int. Cl.$^4$ .................................................. C22C 1/10
[52] U.S. Cl. ..................................... 420/129; 420/590
[58] Field of Search ................... 420/129, 590; 419/45

[56] References Cited

U.S. PATENT DOCUMENTS

| | | | |
|---|---|---|---|
| 2,852,366 | 9/1958 | Jenkins | 75/201 |
| 3,194,656 | 7/1965 | Vordahl | 75/135 |
| 3,415,697 | 12/1968 | Bredzs et al. | 149/109 |
| 3,547,673 | 12/1970 | Bredzs et al. | 117/22 |
| 3,666,436 | 5/1972 | Bredzs et al. | 75/0.5 |
| 3,672,849 | 6/1972 | Bredzs et al. | 29/195 |
| 3,690,849 | 9/1972 | Bredzs et al. | 29/182.5 |
| 3,690,875 | 9/1972 | Bredzs et al. | 75/202 |
| 3,705,791 | 12/1972 | Bredzs et al. | 29/195 |
| 3,726,643 | 4/1973 | Merzhanov et al. | 423/409 |
| 3,785,807 | 1/1974 | Backerud | 75/138 |
| 3,885,959 | 5/1975 | Badea et al. | 148/437 |
| 4,161,512 | 7/1979 | Merzhanov et al. | 423/440 |
| 4,431,448 | 2/1984 | Merzhanov et al. | 75/238 |
| 4,444,603 | 4/1984 | Yamatsuta et al. | 148/127 |
| 4,514,268 | 4/1985 | DeAngelis | 204/67 |
| 4,540,546 | 9/1985 | Giessen | 420/590 |

*Primary Examiner*—Christopher W. Brody
*Attorney, Agent, or Firm*—Herbert W. Mylius; Gay Chin

[57] ABSTRACT

A method is taught for the introduction of in-situ precipitated second phase materials, such as ceramic or intermetallic particles in a metal matrix, to a host metal. When an initial solvent-assisted reaction is utilized, metal-second phase composites having highly superior properties may be obtained. The invention may utilize the reaction of the second phase-forming constituents in a solvent metal medium to provide an intermediate material of finely-dispersed second phase particles in an intermediate metal matrix, in the form of a porous mass or sponge. Any desired loading of second phase in the final composite may be achieved by the admixture of this preformed intermediate material having a relatively high content of particulate material, with a molten host metal. Exemplary materials include titanium diboride in an aluminum matrix and titanium carbide in an aluminum matrix.

74 Claims, No Drawings

PROCESS FOR FORMING METAL-SECOND PHASE COMPOSITES AND PRODUCT THEREOF

CROSS REFERENCE TO RELATED APPLICATION

This is a continuation-in-part of application Ser. No. 662,928, filed Oct. 19, 1984 now abandoned.

BACKGROUND OF THE INVENTION

The present invention comprises a process for the preparation of metal-second phase composite material and the products of that process. In one embodiment, a second phase, such as a ceramic material or an intermetallic, is formed directly in a metallic or intermetallic matrix, in relatively high volume fraction and subsequently added to a metal. The second phase can comprise a ceramic, such as a boride, carbide, oxide, nitride, silicide, sulfide, oxysulfide or other compound, of one or more metals the same as or different than the matrix metal. Of special interest are the intermetallics of aluminum, such as the aluminides of titanium, zirconium, iron, cobalt, and nickel. In the present invention, a relatively high volume fraction of the second phase is prepared in an intermediate metal, metal alloy, or intermetallic matrix, forming an intermediate material which is typically in the form of a "porous sponge", which is then introduced into a molten host metal bath or admixed with solid host metal and heated to a temperature above the melting point of the host metal to disperse the second phase and the intermediate matrix throughout the host metal. The final product is a metal, metal alloy, or intermetallic having improved properties due to the uniform dispersion of very small particulate second phase throughout the final metal matrix, and the resultant fine grain size of the matrix. Either the intermediate metal matrix or host metal, or both, may constitute an alloy of two or more metals, and the intermediate matrix may be the same as, or different than, the host metal. The intermediate matrix should be soluble in the molten host metal bath, or capable of forming an intermetallic therewith.

For the past several years, extensive research has been devoted to the development of metal-second phase composites, such as aluminum reinforced with fibers, whiskers, or particles of carbon, boron, silicon carbide, silica, or alumina. Metal-second phase composites with good high temperature yield strengths and creep resistance have been fabricated by the dispersion of very fine (less than 0.1 micron) oxide or carbide particles throughout the metal or alloy matrix of composites formed, utilizing powder metallurgy techniques. However, such composites typically suffer from poor ductility and fracture toughness, for reasons which are explained below.

Prior art techniques for the production of metal-second phase composites may be broadly categorized as powder metallurgical approaches, molten metal techniques, and internal oxidation processes. The powder metallurgical type production of dispersion-strengthened composites would ideally be accomplished by mechanically mixing metal powders of approximately 5 micron diameter or less with an oxide or carbide powder (preferably 0.01 micron to 0.1 micron). High speed blending techniques or conventional procedures, such as ball milling, may be used to mix the powders. Standard powder metallurgy techniques are then used to form the final composite. Conventionally, however, the ceramic component is large, i.e., greater than 1 micron, due to a lack of availability, and high cost, of very small particle size materials, because their production is energy intensive, time consuming and capital intensive. Furthermore, production of very small particles inevitably leads to contamination at the particle surface, resulting in contamination at the particle-to-metal interface in the composite, which in turn compromises the mechanical properties thereof. Also, in many cases where the particulate materials are available in the desired size, they are extremely hazardous due to their pyrophoric nature.

Alternatively, molten metal infiltration of a continuous skeleton of the second phase material has been used to produce composites. In some cases, elaborate particle coating techniques have been developed to protect ceramic particles from molten metal during molten metal infiltration and to improve bonding between the metal and ceramic. Techniques such as this have been developed to produce silicon carbide-aluminum composites, frequently referred to as SiC/Al or SiC aluminum. This approach is suitable for large particulate ceramics (for example, greater than 1 micron) and whiskers. The ceramic material, such as silicon carbide, is pressed to form a compact, and liquid metal is forced into the packed bed to fill the intersticies. Such a technique is illustrated in U.S. Pat. No. 4,444,603 to Yamatsuta et al, hereby. incorporated by reference. Because this technique necessitates molten metal handling and the use of high pressure equipment, molten metal infiltration has not been a practical process for making metal-second phase composites, especially for making composites incorporating submicron ceramic particles where press size and pressure needs would be excessive and unrealistic.

The presence of oxygen in ball-milled powders used in prior art powder metallurgy techniques, or in molten metal infiltration, can result in a deleterious layer, coating, or contamination such as oxide at the interface of second phase and metal. The existence of such layers will inhibit interfacial binding between the second phase and the metal matrix, adversely effecting ductility. of the composite. Such weakened interfacial contact may also result in reduced strength, loss of elongation, and facilitated crack propagation.

Internal oxidation of a metal containing a more reactive component has also been used to produce dispersion strengthened metals, such as copper containing internally oxidized aluminum. For example, when a copper alloy containing about 3 percent aluminum is placed in an oxidizing atmosphere, oxygen may diffuse through the copper matrix to react with the aluminum, precipitating alumina. Although this technique is limited to relatively few systems, because the two metals must have a wide difference in chemical reactivity, it has offered a possible method for dispersion hardening. However, the highest possible concentration of dispersoids formed in the resultant dispersion strengthened metal is generally insufficient to impart significant changes in properties such as modulus, hardness and the like.

In U.S. Pat. No. 2,852,366 to Jenkins, hereby incorporated by reference, it is taught that up to 10 percent by weight of a metal complex can be incorporated into a base metal or alloy. The patent teaches blending, pressing, and sintering a mixture of a base metal, a compound of the base metal and a non-metallic complexing element, and an alloy of the base metal and the complexing metal. Thus, for example, the reference teaches mixing powders of nickel, a nickel-boron alloy, and a nickel-titanium alloy, pressing, and sintering the mixed powders to form a coherent body in which a stabilizing unprecipitated "complex" of titanium and boron is dispersed in a nickel matrix. Precipitation of the complex phase is specifically avoided.

In U.S. Pat. No. 3,194,656, hereby incorporated by reference, Vordahl teaches the formation of a ceramic phase, such as $TiB_2$ crystallites, by melting a mixture of eutectic or near eutectic alloys. It is essential to the process of Vordahl that at least one starting ingredient has a melting point substantially lower than that of the matrix metal of the desired final alloy. There is no disclosure of the initiation of an exothermic second phase-forming reaction at or near the melting point of the matrix metal.

Bredzs et al, in U.S. Pat. Nos. 3,415,697; 3,547,673; 3,666,436; 3,672,849; 3,690,849; 3,690,875; and 3,705,791, hereby incorporated by reference, teach the preparation of cermet coatings, coated substrates, and alloy ingots, wherein an exothermic reaction mechanism forms an in-situ precipitate dispersed in a metal matrix. Bredzs et al rely on the use of alloys having a depressed melting temperature, preferably eutectic alloys, and thus do not initiate a second phase-forming exothermic reaction at or near the melting temperature of the matrix metal.

DeAngelis, in U.S. Pat. No. 4,514,268, hereby incorporated by reference, teaches reaction sintered cermets having very fine grain size. The method taught involves the dual effect of reaction between and sintering together of admixed particulate reactants that are shaped and heated at temperatures causing an exothermic reaction to occur and be substantially completed. The reaction products are sintered together to form ceramic-ceramic bonds by holding the reaction mass at the high temperatures attained. Thus, this reference relates to a product with sintered ceramic bonds suitable for use in contact with molten metal.

Backerud, in U.S. Pat. No. 3,785,807, hereby incorporated by reference, teaches the concept of preparing a master alloy for aluminum, containing titanium diboride. The patentee dissolves and reacts titanium and boron in molten aluminum at a high temperature, but requires that titanium aluminide be crystallized at a lower temperature around the titanium diboride formed. Thus, the patent teaches formation of a complex dispersoid.

In recent years, numerous ceramics have been formed using a process termed "self-propagating high-temperature synthesis." (SHS). It involves an exothermic, self-sustaining reaction which propagates through a mixture of compressed powders. The SHS process involves mixing and compacting powders of the constituent elements and igniting a portion of a green compact with a suitable heat source. The source can be electrical impulse, laser, thermite, spark, etc. On ignition, sufficient heat is released to support a self-sustaining reaction, which permits the use of sudden, low power initiation at high temperatures, rather than bulk heating over long periods at lower temperatures. Exemplary of these techniques are the patents of Merzhanov et al, U.S. Pat. Nos. 3,726,643; 4,161,512; and 4,431,448 among others, hereby incorporated by reference.

In U.S. Pat. No. 3,726,643, there is taught a method for producing high-melting refractory inorganic compounds by mixing at least one metal selected from Groups IV, V, and VI of the Periodic System with a non-metal, such as carbon, boron, silicon, sulfur, or liquid nitrogen, and heating the surface of the mixture to produce a local temperature adequate to initiate a combustion process. In U.S. Pat. No. 4,161,512, a process is taught for preparing titanium carbide by ignition of a mixture consisting of 80–88 percent titanium and 20–12 percent carbon, resulting in an exothermic reaction of the mixture under conditions of layer-by-layer combustion. These references deal with the preparation of ceramic materials, absent a binder.

When the SHS process is used with an inert metal phase, it is generally performed with a relatively high volume fraction of ceramic and a relatively low volume fraction of metal (typically 10 percent and below, and almost invariably below 30 percent). The product is a dense, sintered material wherein the relatively ductile metal phase acts as a binder or consolidation aid which, due to applied pressure, fills voids, etc., thereby increasing density. The SHS process with inert metal phase occurs at higher temperatures than the in-situ precipitation process used in conjunction with the present invention, and is non-isothermal, yielding sintered ceramic particles having substantial variation in size.

U.S. Pat. No. 4,431,448 teaches preparation of a hard alloy by intermixing powders of titanium, boron, carbon, and a Group I-B binder metal or alloy, such as an alloy of copper or silver, compression of the mixture, local ignition thereof to initiate the exothermic reaction of titanium with boron and carbon, and propagation of the ignition, resulting in an alloy comprising titanium diboride, titanium carbide, and up to about 30 percent binder metal. This reference, however, is limited to the use of Group I-B metals or alloys, such as copper and silver, as binders. Products made by this method have low density, and are subjected to subsequent compression and compaction to achieve a porosity below 1 percent.

U.S. Pat. No. 4,540,546 to Giessen et al, hereby incorporated by reference, teaches a method for rapid solidification processing of a multiphase alloy. In this process two starting alloys react in a mixing nozzle in which a "Melt Mix Reaction" takes place between chemically reactable components in the starting alloys to form submicron particles of the resultant compound in the final alloy. The mixing and chemical reaction are performed at a temperature which is at or above the highest liquidus temperature of the starting alloys, but which is also substantially below the liquidus temperature of the final alloy, and as close to the solidus temperature of the final alloy as possible. While dispersion-strengthened alloys can be produced by this technique, there appear to be a number of inherent difficulties. First, processing is technically complex, requiring multiple furnaces. Second, efficient mixing is important if fine dispersions are to be consistently produced. Lastly, very high degrees of superheat will be required to completely dissolve the rapid solidification alloying elements in order to produce high loading of dispersoid, which necessarily accentuates particle growth, for example, in composites containing 10–20% dispersoid.

The present invention overcomes the disadvantages of the prior art noted above. More particularly, the present invention permits simplification of procedures and equipment compared to the prior art. For example, the present process obviates the need for multiple furnaces and mixing and control equipment because all of the constituents of the second phase are present in a single reaction vessel. The present invention also overcomes the need for forming multiple melts of components at very high melting temperatures. Further, high loading composites can be prepared without the necessity of achieving high levels of superheat in holding furnaces. Applicants' invention also provides for a cleaner particle/metal interface compared with conventional metal-ceramic composites made by techniques using, for example, separate metal and ceramic powders, because the reinforcing particles are formed in-situ. Moreover, the intermediate material formed can be used to make uniform dispersions of substantially unagglomerated particles in a matrix, with controlled volume fractions of second phase materials. With these facts in mind, a detailed description of the invention follows, which achieves advantages over known processes.

SUMMARY OF THE INVENTION

It is an object of the present invention to provide an inexpensive method for forming composite materials, consisting of finely dispersed second phase, such as a particulate ceramic, intermetallic material, or mixtures thereof, in metal, metallic alloy, or intermetallic matrices. For purposes of simplifying further description, the metal, metallic alloy, or intermetallic matrices of the final composite sought may be referred to as "final metal matrix".

The present invention produces an intermediate material comprising a relatively concentrated second phase dispersion in an "intermediate metal matrix." The intermediate metal matrix comprises a "solvent metal," a metal, metal alloy or intermetallic in which the second phase-forming constituents are more soluble than the second phase, and may be the same or different than the final metal matrix desired. This concentrated intermediate material, which may be in the form of a porous "sponge," is utilized to form improved composites by dissolution of the intermediate metal matrix in a "host metal" which is a metal, metal alloy, or intermetallic in which the second phase is insoluble and which when combined with the intermediate metal matrix will yield the desired final metal matrix. This may be accomplished by admixture of the concentrated intermediate material with a molten bath of host metal, metal alloy or intermetallic, or with solid host metal, metal alloy or intermetallic followed by heating to a temperature above the melting point of the host material.

It is a further object of this invention to provide a method for dispersion hardening of metals and alloys. The present invention also incorporates the preparation of an intermediate material suitable for addition to a host metal, said intermediate material comprising second phase particles in an intermediate matrix, such as titanium diboride or titanium carbide in aluminum, without the necessity for utilizing expensive submicron second phase starting materials. Such an intermediate material may then provide the desired volume fraction of submicron particulates when mixed with an appropriate volume of host metal.

The present invention relates to a process for the in-situ precipitation of up to about 95 percent by volume of a second phase material in an intermediate metal matrix, wherein the second phase can comprise a ceramic, such as a boride, carbide, oxide, nitride, silicide, oxysulfide, or sulfide, of a metal the same as or other than the intermediate metal matrix. It has been found that by mixing the constituents or elements of the desired second phase material with a solvent metal, and heating to a temperature at which substantial diffusion and/or dissolution of the reactive elements into the solvent metal can occur, typically at or close to the melting point of the solvent metal, a solvent assisted reaction, which is always exothermic, can be initiated. This solvent assisted reaction results in the extremely rapid formation and dispersion of finely divided particles of the second phase material in the solvent metal.

The present invention also relates to a process for forming metal-second phase composite materials having a relatively uniform dispersion of second phase particulate throughout large volumes of final matrix metal, the process comprising precipitating at least one second phase material in a solvent metal by contacting reactive second phase-forming constituents, in the presence of a solvent metal, at a temperature at which sufficient diffusion of the constituents into the solvent metal occurs to initiate the reaction of the constituents to produce a composite material comprising a relatively high concentration of finely divided particles of second phase material in an intermediate matrix, and introducing the thus produced composite material, or sponge, into a bath of molten host metal, metal alloy or intermetallic to obtain a material comprising the second phase within the final metal matrix.

The invention also relates to a method for dispersing a second phase material in a molten host metal, metal alloy or intermetallic comprising adding a preformed sponge containing an in-situ precipitated second phase material, being an oxide, nitride, boride, carbide, silicide, oxynitride, sulfide or oxysulfide of a transition metal of the third to sixth groups of the Periodic Table, in an intermediate metal matrix, to molten host metal, metal alloy or intermetallic and recovering a product containing the second phase material dispersed therein.

The invention also relates to a method for dispersing a second phase material in a molten host metal, metal alloy or intermetallic comprising introducing a preformed intermediate material containing second phase material, such as an oxide, nitride, boride, carbide, silicide, sulfide or oxysulfide of a transition metal of the third to sixth groups of the Periodic Table, in an intermediate metal matrix, into molten host metal, metal alloy or intermetallic and recovering a product containing the second phase material dispersed therein.

The invention also relates to a composite product comprising a metal having uniformly dispersed therein preformed unagglomerated particles of second phase material previously precipitated in-situ in an intermediate metal matrix.

This invention further relates to a metal matrix composite material wherein the matrix metal exhibits very small grain size, and the second phase particulate is essentially less than five microns in size.

This invention still further relates to a metal-second phase composite wherein from one to about thirty percent by volume of second phase particles are relatively uniformly dispersed in a metal matrix having a grain size approximating one micron.

DESCRIPTION OF THE PREFERRED EMBODIMENTS

The present invention relates to a novel technique for providing a high quality metal matrix composite wherein a porous, friable matrix-second phase master concentrate is converted to a dense composite product.

The technique comprises the preparation of a master concentrate, sponge, or intermediate material of discrete dispersoid particles, each enveloped by an intermediate matrix material, and substantially free of bonding to other dispersoids in the concentrate, followed by admixture of the concentrate in additional host metal.

A detailed description of the reaction associated with the preparation of intermediate material or sponge is set forth in Applicants' parent application Ser. No. 662,928 filed Oct. 19, 1984, the disclosure of which is hereby incorporated by reference.

In the following discussion the terms "host metal" and "host metal bath" should be understood to apply equally to the different embodiments of the present invention where a bath of molten host metal is used, or where solid host metal that is subsequently heated to produce a molten metal is used.

In certain instances, the "host metal" may comprise material other than conventional metals, metal alloys or intermetallics. The host metal may, for example, be a dispersion strengthened metal such as metal containing finely dispersed erbium oxide, thoria, alumina, etc. It is important in these cases that the preexisting dispersion be stable in the molten metal for the time/temperature required for introducing the intermediate material. Similarly, it is possible to use a metal-second phase composite, prepared in accordance with the present invention, as the host metal. The advantage of utilizing a material containing a second phase dispersion as the host is that a bimodal distribution of second phase types, shapes, amounts, etc. may be obtained. An example would be the use of an aluminum matrix containing a dispersion of essentially equiaxed $TiB_2$ particles, to which an intermediate material containing TiN needle shaped particles is added. A combination of dispersion strengthening and high temperature creep resistance is obtained. In accordance with the foregoing discussion, it must be understood that terms such as "host metal," or "host metal, metal alloy or intermetallic" encompass the types of materials discussed above containing preexisting second phase dispersions.

As utilized herein, the term solvent metal shall refer to the reaction medium in which the second phase-forming constituents combine or react, while the terms intermediate metal and intermediate metal matrix shall refer to the precipitate-containing matrix. The intermediate material or porous sponge may thus comprise the second phase precipitates in a matrix of the solvent metal, an alloy of the solvent metal, or a mixture of metals including the solvent metal.

The present invention encompasses two features that run directly contra to the prior art wisdom in materials science, and particularly in the field of metal-second phase composites. Firstly, the process may employ preformed compacts of poor integrity, low strength and cohesion, high porosity, etc.; and secondly, the process uses these preforms in combination with molten metal to recover high quality, dense materials whose properties may be tailored, via the present invention, to suit the demands of particular uses.

It should be noted initially that processes resulting in the recovery of poor quality compacts, as described above, yield products that would have heretofore been regarded as useless in the prior art. For example, in the preparation of ceramic bodies by SHS, a limiting feature in the process, as a means of producing useful ceramic shapes or parts, has been the inherently poor mechanical quality of the body frequently formed by the self-propagating synthesis. Accordingly, attempts have been made to enhance the quality of such bodies by techniques such as elevated pressures at temperature to cause diffusion, sintering, and densification. In contrast, such properties as friability, low strength, and porosity have been found, surprisingly, to be advantageous in the process herein disclosed. By way of methods for the preparation of such poor quality compacts, particular attention is directed towards in-situ precipitation techniques. However, exothermic second phase forming reactions in the presence of substantially nonreactive metal are also considered within the scope of the present invention.

The second surprising feature in the present process is that molten metal may be used to advantage in the production of composites, even though it is well known in the art that molten metal should be specifically avoided in the fabrication and utilization of metals, ceramics and composites. Thus, for example, the infiltration of molten metals into conventional polycrystalline metals results in grain boundary dehesion, facilitated crack propagation, and hence brittleness. As a consequence, there have traditionally been problems, for example, with the containment of molten metal in metallic containers (of higher melting point) because of progressive loss of strength and integrity (the phenomenon of liquid metal embrittlement). Similarly, in the use of ceramics in molten metal contacting applications, service longevity has always been a problem owing to molten metal attack, even with the most chemically inert and resistant materials. Thus, for example, the containment of molten aluminum by $TiB_2$ has been a long standing, and still commercially unresolved problem, owing to penetration of the molten metal along the ceramic grain boundaries where reaction takes place with contaminants. Progressive penetration and reaction ultimately leads to loss of intergranular cohesion, mechanical weakness, and disintegration.

The presence of molten metal is equally disadvantageous in the manufacture and use of metal-second phase composites, where it has been regarded as of paramount importance to avoid the introduction of molten metal. Several examples are known to illustrate the type of problems that can arise. In the preparation of composites of SiC in Al, as was pointed out earlier, precautions must be taken, such as proprietary coating techniques, to avoid prolonged direct contact of the molten metal and particulate (or the ceramic skeleton in the case of molten metal infiltration). Absent such precautions, the metal and ceramic react together, a process that obviously diminishes the amount of particulate reinforcement, but also generates reaction products that may render the composite extremely susceptible to subsequent corrosion. Analogous problems occur when attempts are made to weld the SiC/Al because, as the melting temperature of the matrix metal is exceeded, the same harmful reactions occur. In the case of thoria-dispersed (TD) nickel, the composite is produced via solid powder metallurgical techniques, as opposed to liquid metal (ingot metallurgy), because the thoria ceramic tends to segregate, and even rise to the surface of the melt, due to surface tension effects. As with SiC/Al, welding is again a problem because of the presence of liquid metal, this time giving rise to the above-noted segregation.

It would thus be expected that the combination of poor quality metal-second phase preforms with molten metal would not lead to the recovery of a useful product. However, it has surprisingly been found that employing these features according to the teachings of the present invention yields unexpected and quite unobvious benefits, yielding products that had heretofore been unattainable using prior art techniques.

In addition to the novel and beneficial processing features alluded to above, reference is made to the advantages deriving from an in-situ second phase deposition process, such as clean coherent interfaces between the metal and second phase. The present invention allows these advantages to be incorporated, while avoiding some of the shortcomings inherent to the in-situ precipitation process. Thus, for the production of fine precipitates, the in-situ process must, by necessity, avoid prolonged heating at elevated temperatures, which results in particle growth. For this reason, relatively high concentrations of dispersoid precursor are preferred in order that the brief duration of exothermic reaction heat be sufficient to complete the in-situ formation process. In the case of lower dispersoid concentrations, the amount and time of external heat that must be applied to complete the reaction are such that particle growth may be a problem. Thus, the range of second phase loadings that may be recovered in a product is constrained by these criteria. However, when the present invention is applied, the constraint disappears because the particle formation process may be conducted under the circumstances that most effectively lend themselves to the production of second phase of the desired morphology, size, type and other characteristics, without regard to loading level. This preform is then combined with molten host metal according to the present teachings, in variable amounts, to provide full latitude in dispersoid concentration in the recovered product.

The present invention may incorporate a novel process for the in-situ precipitation of fine particulate second phase materials, such as ceramics or intermetallics, typical of which are refractory hard metal borides or aluminides, within metal, alloy, or intermetallic systems to produce an intermediate metal-second phase composite suitable for use as a master concentrate, sponge, or intermediate material as described above. However, the process described may also be used for introducing larger particles of a second phase material into the molten host metal, up to the point at which such larger particles result in component embrittlement, or loss of ductility, etc. The improved properties of the novel composites offer weight-savings in stiffness limited applications, higher operating temperatures and associated energy efficiency improvements, and reduced wear in parts subject to erosion. A specific use of such material is in the construction of turbine engine components, such as blades.

In this context, it should be noted that the metal-second phase products of the present invention are also suitable for use as matrix materials, for example, in long-fiber reinforced composites. Thus, for example, a particulate reinforced aluminum composite of the present invention may be used in conjunction with long SiC or carbon fibers to enhance specific directional properties. Typical fabrication routes for such materials include diffusion bonding of thin layed-up sheets, and molten metal processing. For molten metal processing, advantage may be taken of enhanced metal wetting by the composite compared to the unmodified metal absent second phase material. For example, molten aluminum containing dispersed $TiB_2$, as prepared by the present process, wets graphite while unreinforced aluminum metal does not. Thus, graphite fiber-aluminum matrix composites may advantageously be prepared using the metal-second phase composites of the present invention as matrix material.

A method is taught whereby the second phase-forming elements are caused to react in a solvent metal to form a finely-divided dispersion of the second phase material in an intermediate metal matrix. The second phase-forming constituents most easily combine at or about the melting temperature of the solvent metal, and the exothermic nature of this reaction causes a very rapid temperature elevation or spike, which can have the effect of melting additional metal, simultaneously promoting the further reaction of the second phase-forming constituents.

In systems where the reactive elements have substantial diffusivity in the solid solvent metal, the reaction may be initiated at temperatures well below the melting point of the solvent metal. Thus, a solid state initiation is possible, wherein a liquid state may or may not be achieved.

Exemplary of suitable second phase ceramic precipitates are the borides, carbides, oxides, nitrides, silicides, sulfides, and oxysulfides of the elements which are reactive to form ceramics, including, but not limited to, transition elements of the third to sixth groups of the Periodic Table. Particularly useful ceramic-forming or intermetallic compound-forming constituents include aluminum, titanium, silicon, boron, molybdenum, tungsten, niobium, vanadium, zirconium, chromium, hafnium, yttrium, cobalt, nickel, iron, magnesium, tantalum, thorium, scandium, lanthanum, and the rare earth elements. Particularly useful additional intermetallic-forming elements include copper, silver, gold, zinc, tin, platinum, manganese, lithium and beryllium. Preferred second phase materials include titanium diboride, titanium carbide, zirconium diboride, zirconium disilicide, and titanium nitride.

As the solvent metal, one may use a metal capable of dissolving or sparingly dissolving the constituents of the second phase, and having a lesser capability for dissolving the second phase precipitate. Thus, the solvent metal component must act as a solvent for the specific reactants, but not for the desired second phase precipitate. It is to be noted that the solvent metal acts primarily as a solvent in the process of the present invention, and that the constituents of the second phase precipitate have a greater affinity for each other than either has for the solvent metal, which does not react significantly with the second phase dispersoids within the time frame of the exothermic excursion. Additionally, it is important that the second phase-forming reaction releases sufficient energy for the reaction to go substantially to completion. It must be noted that while a large number of combinations of matrices and dispersoids may be envisioned, the choice of in-situ precipitated phase (ceramic or intermetallic) in any one given matrix, is limited by these criteria.

Suitable solvent metals include aluminum, nickel, titanium, copper, vanadium, chromium, manganese, cobalt, iron, silicon, molybdenum, beryllium, silver, gold, tungsten, antimony, bismuth, platinum, magnesium, lead, zinc, tin, niobium, tantalum, hafnium, zirconium, and alloys of such metals.

The host metal may be any metal in which the second phase precipitate is not soluble, and with which the second phase does not react during the time/temperature regime involved in the intermediate material admixture step, subsequent fabrication, and/or recasting. The host metal must be capable of dissolving or alloying with the solvent and/or intermediate metal and must wet the intermediate material. Thus, the host metal may be a solvent metal, an alloy of a solvent metal, or a metal in which the solvent metal and the intermediate metal are both soluble. When alloys are utilized as the host metal, such as aluminum-lithium alloys containing up to about 5 percent by weight lithium, one may substantially retain the beneficial properties of the alloys, and increase, for example, the modulus of elasticity, high temperature stability, and wear resistance, although some loss of ductility may be encountered in certain soft alloys. For example, 7075 aluminum alloy, containing from about 5 percent to about 40 percent by weight titanium diboride, shows the same beneficial effect of age-hardening as 7075 alloy alone, but exhibits a substantial increase in modulus of elasticity, higher temperature capability, greater high temperature stability, and extremely high wear resistance. Aluminum-lithium alloys are of particular interest due to their high modulus and low density characteristics. With each weight percent addition of lithium to aluminum, density decreases by almost 6 percent. Further, lithium greatly reduces the surface energy of molten aluminum, which is believed to aid in the wetting and infiltration of intermediate materials as they are contacted by molten aluminum-lithium host metal. Further, the composites of the present process may be fabricated in substantially conventional fashion, by casting, forging, extruding, rolling, machining, etc. The composites of the present process may also be remelted and recast while retaining substantial uniformity in second phase particle distribution, retaining fine second phase particle size, fine grain size, etc., thereby maintaining associated improvements in physical properties. Aside from the obvious benefits in subsequent processing and fabrication, the ability to remelt and recast these materials permits recycling and reuse thereof, unlike known prior art metal-ceramic composites.

In accordance with the present invention, in-situ precipitation enables preparation of somewhat porous, or sponge-like composites containing a second phase concentrate, which may, in turn, be utilized to introduce the second phase into a molten host metal in controlled fashion. Thus, a composite may be prepared in the form of an intermediate material having, for example, a high percentage of a second phase, such as titanium diboride, in an intermediate matrix metal, such as aluminum. This intermediate material is then added to a molten host metal, metal alloy or intermetallic bath, or admixed with solid host metal, metal alloy or intermetallic, then heated to a temperature above the melting point of the host metal, to achieve a composite having the desired loading of second phase. The host metal may be the same or different from the intermediate matrix metal of the intermediate material.

Varying amounts of the second phase material may be incorporated into the composite material by the process of the present invention, depending upon the end use and the properties desired in the product. For instance, to produce dispersion strengthened alloys having high modulus, one may utilize a range of about 0.1 to about 30 percent by volume, and preferably from about 5 percent by volume to about 25 percent by volume, and more preferably from about 5 to about 15 percent by volume of second phase. However, for purposes other than dispersion strengthening, the second phase volume fraction may be varied considerably, to produce a composite with the desired combination of properties, within the range of from about 1 percent by volume up to the point at which ductility is sacrificed to an unacceptable extent. The primary determining factors of the composition of the composite will be the intended use of the products. Thus, for example, for uses such as cutting tools, the properties will be the wear and chip resistance of the composite material produced. It is possible to effectively tailor the composition to achieve a range of desired properties by controlling the proportions of the reactant and solvent materials.

In addition to controlling the second phase amount, it is possible to effectively engineer materials by manipulating the types of matrix and second phase. Thus, for example, a reinforced matrix may be obtained by using a dispersion strengthened metal or a metal-second phase composite as host. Another dispersoid type could then be added, for example, as high aspect ratio needles, in an intermediate metal matrix. Depending on the final engineering requirements for the product, a wide variety of such controls may be applied to tailor the type, amount, morphology, etc. of matrix and second phase.

The term "sponge" is utilized to describe the in-situ precipitated second phase-intermediate metal matrix composite or intermediate material previously described. The degree of porosity of the "sponge" can be varied by procedures such as vacuum degassing or compression applied prior to, during, or subsequent to initiation of the second phase-forming reaction. Porosity of the intermediate material or sponge can be minimized by a vacuum degassing operation prior to initiation of the reaction, if so desired. The degree of vacuum applied and temperature of the degassing step is determined purely by the kinetics of evaporation and diffusion of any absorbed moisture or other gases. High vacuum and elevated temperatures aid the degassing operation.

Absent the degassing step, the composite formed may be relatively porous, and relatively low in density compared to theoretical density. Higher porosity is, in most cases, preferred, since it is conducive to more rapid dissolution of the intermediate matrix in the host metal. It may even be desirable, in some instances, to incorporate a porosity enhancer, such as a low boiling point metal, e.g., magnesium or zinc, in the initial reaction mixture. The enhancer volatilizes during the in-situ reaction, thereby increasing porosity of the resultant intermediate material. In such a state, this material, which may be referred to as "sponge," and typically has a high second phase loading, may be added to a measured volume of host metal (either the same or different from the intermediate metal matrix in which the dispersoid was first formed) to achieve a specifically desired second phase volume fraction.

Relatively large amounts of the second phase in the intermediate metal matrix may be achieved while retaining substantially uniform dispersion of discrete second phase particles within the intermediate metal matrix. The uniform dispersion of second phase particles in a metal matrix has long been sought. In most cases, it is not advantageous or it may not be possible to directly precipitate the desired second phase in the presence of the molten metal constituting the final matrix material. Even if the second phase could be formed in-situ directly in the desired matrix material, the handling of large volumes of molten metal subject to the temperature rise resulting from the exothermic second phase-forming reaction makes the use of in-situ formation undesirable for the direct production of large volumes of composite.

Surprisingly, the present invention has solved such problems by the formation of an intermediate material of concentrated second phase content. As formed, the second phase particles of the composite do not suffer from oxide or other deleterious covering layers which form on prior art ceramic powders. The in-situ formed second phase, such as ceramic, of the present invention, uniformly dispersed within an intermediate metal matrix may be introduced into a molten host metal bath to redisperse the second phase particles of the intermediate material throughout the bath. The molten host metal of the bath may be of such composition that in-situ precipitation of the desired second phase could not occur within the bath or occur only with difficulty. Thus, metals other than the intermediate matrix metal may be provided with a uniform dispersion of second phase particles of submicron and larger size. The molten host metal may also be the same as the intermediate matrix metal of the intermediate material, but of so great a volume, as compared to the intermediate material, that in-situ second phase precipitation would be difficult to effect or to control, or uniform dispersion impossible to achieve.

It is believed that the prior art suggestions of introduction of fine second phase particles directly to a molten metal bath are technically difficult and produce metal products having less desirable properties upon solidification due to a deleterious layer, such as an oxide, which forms on the surface of each second phase particle at the time of or prior to introduction into the molten metal bath. The second phase particles of the present invention, being formed in-situ, do not possess this deleterious coating or layer. Thus, the present invention produces metal products having unexpectedly superior properties.

Three basic reaction modes to make sponge or intermediate material via in-situ precipitation have been identified in accordance with the present invention. In the first mode, the starting materials constitute individual powders of each of the solvent metal and the individual constituents of the second phase to be formed. For example, a mixture of aluminum, titanium, and boron may react to form a dispersion of titanium diboride in an aluminum intermediate matrix.

In the second aode of the invention, individual alloys may be reacted, one such alloy comprising an alloy of the solvent metal with one of the constituents of the second phase, and the other comprising an alloy of the same solvent metal, or another metal with which the solvent metal readily alloys, with the other constituent of the second phase. As an example of using two alloys of a common metal, a mixture of aluminum-titanium alloy with aluminum-boron alloy may be reacted, to form a dispersion of titanium diboride in aluminum. This alloy-alloy reaction route may, in some cases, be relatively slower than the elemental route, yet may offer economic advantages because the alloys utilized can be cheaper than the elemental powders.

The third reaction mode constitutes a combination, or intermediate, of the first two modes discussed above. Thus, one may react a premixed alloy containing one reactive species and a metal which contains or may.be the solvent metal, with an elemental powder of the second reactive species, such as combining an aluminum-titanium alloy with elemental boron powder. This reaction mode may be relatively more expensive than the alloy-alloy reaction mode, but offers a more rapid reaction, which in turn permits formation of finer particle precipitates than obtainable by the alloy-alloy route. However, the alloy-elemental powder reaction mode could be relatively less expensive, although slower, than the elemental powder mode, in most cases.

Moreover, the three reaction modes may occur in different physical states. Each of the first two basic modes of the solvent assisted reaction may occur in three physical states. The elemental powders can react to form the desired second phase via diffusion of the reactive species through the liquid solvent or, in cases where diffusion is very rapid, initiation in a solid state is possible. Reaction may also be achieved in a plasma device, for example, by striking an arc between electrodes of the two starting ingredients or by introducing the compacted and granulated starting mixture into a plasma flame. The third reaction mode, also, may function in all three states. That is, the reaction of an alloy with an elemental powder may be conducted as a liquid state reaction, a solid state reaction, or in a plasma apparatus.

It is also to be noted that complex compounds, as well as plural second phases, may be precipitated by these three reaction modes. Thus, intermediate metal matrix combinations with complex ceramics, such as titanium zirconium boride, are possible to be prepared.

It is particularly to be noted that the prior art teaches that the combination of elemental metal alloys or powders, particularly of a coarse particulate size, would yield intermetallic compounds. In fact, conventional techniques for forming intermetallics involve, for example, reacting a mixture of titanium and aluminum, to form titanium aluminide, and a mixture of boron and aluminum to form aluminum diboride. Thus, one would expect that a mixture comprising powders of titanium, aluminum, and boron would yield an aggregate agglomeration of titanium aluminide, aluminum diboride, and possibly, titanium diboride. In contrast, the present invention provides for the formation of essentially Just one finely dispersed precipitate from the two reactive components in a matrix of the third component. It is important that the second phase precipitate material not be soluble in the solvent metal, while the constituents of the second phase, individually, are at least sparingly soluble in the solvent metal. Thus, the exothermic dispersion reaction mechanism depends upon a certain amount of each second phase-forming constituent dissolving and diffusing in the solvent metal, and while in solution (either liquid or solid state), reacting exothermically to form the insoluble second phase, which precipitates rapidly as a fine particulate. The solvent metal provides a medium in which the reactive elements may diffuse and combine. Once the initial reaction has occurred, the heat released by the exothermic reaction causes additional solvent metal to melt, thereby enhancing diffusion of reactive components in the solvent metal, and completing the reaction.

The cool-down period following initiation of the reaction and consumption of the reactive constituents is believed important to achieving very small particle size and limiting particle growth. It is known that at high temperatures, it is possible for the second phase particles to grow, or sinter together. This should also be avoided, in most cases, because of the negative effect of large particle sizes on ductility. The cool-down or quenching of the reaction is, in a sense, automatic, because once the second phase-forming constituents are completely reacted, there is no further energy released to maintain the high temperatures achieved. However, one may control the rate of cool-down to a certain extent by control of the size and/or composition of the mass of material reacted. That is, large thermal masses absorb more energy, and cool down more slowly, thus permitting growth of larger particles, such as may be desired for greater wear resistance, for example, for use in cutting tools.

Particle size considerations have a direct impact on the grain size of the metal-second phase composite product because the grain size is generally controlled by the interparticle spacing of the dispersoid. The interparticle spacing varies with the volume fraction and size of the dispersoid. Thus, relatively high loadings of very fine second phase particles produce the finest grained product materials. Typically the grain size of the product of the present invention is in the vicinity of one micron for second phase volume fractions between 5 percent and 15 percent. Fine grain size is extremely important, for example, in precision casting and in applications where fatigue resistance is required. By way of illustration, it is known in the manufacture of jet engine compressor disks that fine grain size and low porosity must be achieved. To initially reduce porosity of conventional materials, the cast product is subjected to hot-isostatic pressing. However, the severity of the time/temperature treatment that can be applied is limited by the grain growth that results from long times at high temperature. Accordingly, a compromise quality is obtained between sufficient densification while minimizing grain growth. The composite products of the present invention may be used to advantage in applications like this because the stable finely dispersed array of precipitates pins grain boundaries, thereby minimizing grain growth. Accordingly, in the above example, higher temperatures and longer times are possible in the hot-isostatic-press to reduce porosity without compromising grain size.

The reaction initiation temperature has for the in-situ second phase-forming reaction generally been found to be relatively close to the melting temperature of the solvent metal utilized in liquid state reactions. For example, in the production of a second phase of ceramic titanium diboride in an aluminum intermediate matrix, the reaction proceeds at a temperature around 670° C., or very close to the melting point of the aluminum solvent. It should be noted that in the absence of a solvent metal, the reaction of titanium and boron to form titanium diboride was not observed to activate below a temperature of about 900° C. While it is unnecessary to actually reach the melting temperature to initiate the reaction, a temperature where localized melting occurs or where substantial diffusion of the reactive species in the solvent metal can occur must be achieved. In some cases, as temperature increases it is possible for the starting constituents to diffuse into the solvent metal, forming an alloy therewith having a lower melting temperature than the solvent metal. Thus, reaction initiation temperature is lowered.

Regarding impurities, the solvent metal may be alloyed in conventional manner, while in the reactive constituents, large amounts of alloying elements or impurities may cause problems in certain instances. For example, the presence of large amounts of magnesium in boron may inhibit the formation of titanium diboride in an aluminum intermediate matrix by forming a magnesium-boron complex on the surface of the boron particles, thus limiting diffusion of the boron in the intermediate matrix. However, the presence of magnesium in the aluminum does not have this effect. That is, boride forming materials in the boron itself may inhibit the desired dissolution or diffusion of the boron and its subsequent reaction to form titanium diboride. Likewise, thick oxide films around the starting constituent powders may also act as barriers to diffusion and reaction. Extraneous contaminants, such as absorbed water vapor, may also yield undesirable phases such as oxides or hydrides, or the powders may be oxidized to such an extent that the reactions are influenced.

It is noted that undesirable compounds which may be formed from the reaction of one constituent and the solvent metal during the present intermediate material formation process can be essentially eliminated in some instances by the addition of more of the other constituent. For example, titanium aluminide formation in the titanium diboride-aluminum intermediate material can be substantially eliminated by adding additional boron above stoichiometric proportion to the mixture prior to initiation of the second phase-forming reaction. The boron can be in the form of elemental boron, boron alloy or boron halide. Such a boron addition also provides the benefit that any free titanium, which can adversely affect the viscosity of the melt for casting operations, is converted to titanium diboride.

It is also to be noted that, in accordance with the present intermediate material formation process, the complex precipitation of a plurality of systems may be caused. Thus, it is possible to precipitate complex phases, such as $Ti(B_{0.5}CO_{0.5})$, or alternatively, to precipitate a mixture of titanium diboride and zirconium diboride in an aluminum intermediate matrix, in accordance with the reaction:

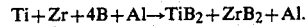

$$Ti + Zr + 4B + Al \rightarrow TiB_2 + ZrB_2 + Al.$$

Substitution of titanium by zirconium, or vice versa, is also possible, yielding borides of the generic type $(Ti, Zr)B_2$.

It is also possible to achieve a low temperature solvent assisted reaction in a metal which has a high melting temperature by alloying or admixing the high melting metal with a lower melting solvent metal. For example, titanium diboride has been precipitated at very low temperatures, such as 620° C., in cobalt, chromium, and nickel matrices, by including up to 20 percent by weight aluminum. In the absence of the alloying aluminum, the reaction requires temperatures of about 900° C. or greater.

Further, this invention may be used to obtain metal-second phase composites wherein the matrix metal is toxic or dangerous to work with. For example, hot beryllium is highly toxic, and the use of a highly exothermic reaction to precipitate a second phase in-situ in beryllium could be extremely hazardous. Accordingly, an intermediate metal matrix of copper may be utilized to provide an intermediate material which may be dissolved in beryllium, providing a beryllium matrix, alloyed with copper, said matrix having evenly dispersed submicron dispersoids therein. Beryllium second phase composites produced by this approach will have fine grain size and exhibit improved low temperature ductility.

In accordance with the present invention, it has been found that the powders need not be compacted prior to firing, but doing so allows easier diffusion and thus initiation at lower temperatures. For instance, loose powder mixtures of aluminum, titanium and boron do not react until approximately 670° C., whereas highly compacted powders react at approximately 620° C. This is due to localized melting, and increased diffusion, which are possible when the powders are in close proximity.

The starting powders must be protected from extensive oxidation due to exposure to the atmosphere, as this will restrict the diffusion of the components into the solvent metal, and the reaction should preferably be carried out under an inert gas to avoid oxidation at high temperatures.

A method is also taught whereby particle growth of the second phase can be controlled. As is known in the art, the elevated temperatures produced, for example, by the exothermic spike, will remain higher and subside more slowly for a large mass of material than for a smaller mass. These conditions of high temperature for long periods of time favor particle growth of ceramics. Thus, the formation of relatively small dimension concentrates or "sponges" of in-situ formed second phase will facilitate quicker cooling and limit particle growth or sintering of the second phase, as will be discussed hereinafter.

The particle size of the precursor powders utilized in the elemental powder mode may not be very critical. Particle size of the second phase reaction product is, however, dependent upon heat-up rate, reaction temperature, cool-down rate, crystallinity and composition of the starting materials. Appropriate starting powder sizes may range from less than 5 microns to more that 200 microns. For economic reasons, one normally may utilize larger particle size powders. It has been found that the particle size of the precipitated second phase in the intermediate metal matrix may vary from less than about 0.01 microns to about 5 microns or larger, dependent upon factors such as those discussed above.

Some specific reactant properties have a greater impact than powder particle size on the particle size of the second phase produced. For example, the use of amorphous boron may result in the precipitation of a finer particle size titanium diboride than does the use of crystalline boron in an otherwise comparable mixture. The precipitation of specific particle size second phase may be selectively controlled by proper control of starting composition, temperature of reaction, and cool-down rate.

The production of relatively porous composites, containing high loadings of the second phase, provides a technique for the production of second phase dispersoids of high purity, and desired particle size. These dispersoids may be introduced in the required concentration into another volume of metal. This may be achieved by selective dissolution of the intermediate matrix metal, yielding a suspension of second phase particles in the dissolution medium. When the dissolution medium is another metal, a dispersion of a second phase in a matrix in which it may not be directly precipitated may be achieved. It is preferred that the melting point of the host metal be above the melting point of the intermediate matrix metal, and that there is sufficient miscibility of the two liquid metals to ensure alloying-/combination. For example, titanium can be reinforced by precipitating titanium diboride in aluminum, and subsequently introducing the titanium diboride/aluminum composite into molten titanium to dissolve the intermediate matrix and form a titanium-aluminum matrix having titanium diboride dispersed therein.

It is possible to dissolve an intermediate matrix metal having a higher melting point in a host metal of lower melting point at a temperature above the melting point of the intermediate matrix metal, provided that there is sufficient miscibility of the two liquid metals to ensure alloying/combination, or below the melting point of the intermediate matrix metal provided there is sufficient liquid solubility for the solid intermediate matrix metal into the host metal, by, for example, crushing the intermediate material to increase the exposed surface area of metal for dissolution, prior to addition to the host metal.

In selecting the constituents and the solvent metal for the composite materials produced by the above-described precipitation process, it is important that the formed second phase material have a low solubility in the molten mass, for example, a maximum solubility of 5 weight percent, and preferably 1 percent or less, at the temperature of the molten mass. Otherwise, significant particle growth of the second phase material may be experienced over extended periods of time. For most uses of the composite materials, the size of the second phase particles should be as small as possible, and thus particle growth is undesirable. When the solubility of the formed second phase material in the molten mass of host metal is low, the molten mass with dispersed second phase particles can be maintained in the molten state for a considerable period of time without growth of the second phase particles. For example, a molten mass of aluminum containing dispersed titanium diboride particles can be maintained in the molten state for three to four hours without appreciable particle growth.

As was previously mentioned, the present invention concerns initially preparing intermediate material concentrates of the subject composite materials. Generally, the intermediate material admixture route comprises initially preparing a reactant mixture of at least one metal and ceramic or other second phase-forming constituents and then heating to produce the in-situ reaction as described herein to form fine particles of ceramic or other second phase material dispersed in an intermediate metal matrix. The concentration or loading of second phase material produced by the former process is generally rather high, for example, at least about 10 weight percent, preferably at least 15 percent, up to 80 or 90 weight percent or more, of second phase material in the resultant composite. Generally, concentrations below about 10 weight percent are not economical for further dilution, and concentrations in excess of about 90 percent are not advisable, as agglomeration, particle growth, and sintering may inhibit uniform particle distribution dependent upon the specific metal/second phase system. After solidification, the intermediate material can be comminuted to a convenient size. Alternatively, the reaction melt can be introduced directly into molten metal without solidification. The melt may also be is directly reduced to powder by methods such as spray atomization and the like.

Alternative means exist for preparing second phase containing materials which may be utilized in the present intermediate material admixture route. Exemplary processes include, amongst others, modifications or variations upon the methods disclosed by Bredzs, Merzhanov, Vordahl, and Giessen, previously discussed, and incorporated herein by reference. One alternative means for producing intermediate material suitable for addition to host metal in the present invention involves mixing and compacting second phase-forming constituent and solvent metal powders, followed by local ignition of the compact to initiate a second phase-forming reaction which propagates through the compact, forming a dispersion of second phase particles in the substantially nonreactive solvent metal. The second phase-forming constituents and solvent metal may be provided as individual powders, or at least one second phase-forming constituent may be provided as an alloy of the solvent metal.

To be used effectively in the present admixture process, it is important that such metal-second phase materials adhere to certain criteria. For example, the matrix material should readily alloy/combine with the host metal matrix, while the second phase dispersoids should neither react with nor dissolve in the host metal matrix during the time/temperature regime involved in the admixture process. Suitable processes for forming second phase containing materials are typically exothermic second phase forming reactions in the presence of an inert metal phase. Only those processes that yield substantially unsintered second phase particles are useful in the present invention. In addition, the second phase containing material should be wetted by the molten host metal to promote dispersion of second phase throughout the molten host.

The next step in the intermediate material admixture route is addition of the intermediate material to host metal, which can be the same or a different metal than the solvent metal used in the in-situ precipitation reaction of the intermediate material formation. Generally, this addition may be accomplished by preparing a melt of the molten host metal and adding the intermediate material to the melt, or alternatively, placing both the intermediate material and the additional host metal in solid form in a vessel and then heating to a temperature such that the host metal melts. Another alternative method for introducing intermediate material to the molten metal is by injection of finely crushed intermediate material via an inert, e.g. argon, or reactive, e.g. chlorine, gas stream using a suitable lance. The use of reactive gasses may also be desirable for removing oxygen and hydrogen from the melt. Dispersion of the second phase material in the melt is facilitated by melt agitation generated by mechanical stirring, gas bubbling, induction stirring, ultrasonic energy, and the like. A preferred method, for example, in the addition of an intermediate material containing about 60 weight percent titanium diboride in an aluminum intermediate matrix to host aluminum, is to heat the host metal to 750° C., crush and slowly add the intermediate material to the melt while mechanically stirring, continue stirring the melt for 5 minutes, allow the melt to stand for 10 minutes at 750° C., stir the melt for an additional 5 minutes, and cast the melt at 750° C. While in the molten state, various clean-up techniques, such as the use of fluxes, scavengers and the like, can be employed to remove impurities, such as oxides, from the melt. For example, in titanium based materials, small additions of rare earth elements, such as erbium, can act as scavengers for interstitial oxygen. Once dispersion of the second phase material is complete, the melt may be solidified by conventional techniques, such as chill casting, to yield very low porosity composites. Filtering prior to solidification may also be desirable in some instances. In the foregoing description, the terms molten metal and matrix metal also encompass metal alloys and intermetallics.

The use of intermediate material, particularly that having a high loading of second phase material, is advantageous because one can simply make a single batch of intermediate material, with which one may produce a wide variety of composites having different second phase loadings. Another advantage is that the host metal used to form the melt need not be in powder form, thereby saving considerably on raw material production costs. Additionally, with the intermediate material admixture procedure, it is possible to form the second phase material in a solvent metal which is conducive to the formation of particles of a desired type, size, and morphology, and thereafter incorporate the particles in a molten host metal in which such particles cannot be produced by the in-situ precipitation reaction, due to relative differences in melting point, for example.

A further advantage of the use of the intermediate material admixture concept is the fact that in the in-situ precipitation of second phase material in a solvent metal, the particle size of the second phase material appears to be related to the loading level of the second phase material. For example, in titanium diboride-aluminum composites, particle size decreases with higher concentration, up to about 40–60 percent second phase material, and then the particle size increases as the concentration approaches 100 percent. Also, the incidence of interparticle sintering may increase in some systems as the volume fraction of the second phase is increased above about 70 percent. Thus, for example, if the smallest possible particle size was desired in a final composite having a low second phase concentration, one could prepare a second phase-containing intermediate material in the 40–60 percent concentration range of titanium diboride to yield the smallest particles possible, and thereafter admix the intermediate material to the desired second phase concentration.

It is noted that in the present intermediate material admixture process, a portion of unreacted constituent in the intermediate material which may produce undesirable effects, such as the formation of large particle size intermetallics, when the intermediate material is added to the molten host metal, can be essentially eliminated in some instances by addition of more of the other constituent to the molten host metal. For example, unreacted titanium in an aluminum-titanium diboride intermediate material, when added to a bath of molten host aluminum, could bond with the aluminum and adversely effect the viscosity of the melt. However, by adding boron to the molten host aluminum, substantially all free titanium will bond with the boron (thus producing titanium diboride), eliminating these problems.

Examples 1 and 2 illustrate the precipitation of fine particles of titanium diboride in aluminum by powder-powder mode reactions, in the liquid state and in the solid state. Unless otherwise specified, percentages in examples are by weight.

EXAMPLE 1

A mixture of 34 percent by weight of titanium powder, 16 percent by weight of boron, and 50 percent by weight of aluminum, is isostatically compacted to 38,000 pounds per square inch. The compacted artifact is then heated in a furnace set at a temperature of 800° C. Upon reaching approximately 670° C., a rapid increase in temperature to approximately 1250° C. is noted. The rate of increase in temperature is very rapid (greater than 900° C. per minute) followed by a fast cool down rate of approximately 400° C. per minute. On subsequent examination, the sample was found to contain a fine dispersion (0.1–3 microns) of titanium diboride particles in an aluminum matrix.

EXAMPLE 2

A mixture of 20.5 percent titanium, 9.5 percent boron and 70 percent by weight cobalt is isostatically pressed to 40,000 pounds per square inch and heated in a furnace. A highly exothermic reaction occurred at 800° C., with a temperature rise to about 600° C. Subsequent X-ray analysis identified the presence of titanium diboride in a cobalt matrix. It is shown here that if sufficient diffusion of the reactive species can occur, the initiation temperature can be below the melting point of the solvent metal, which in this case is 1495° C., and the reaction may initiate in the solid state.

The alloy-alloy reaction, in the liquid state, is exemplified by Examples 3 and 4, described below.

EXAMPLE 3

Two separate aluminum alloys, one containing 10 percent titanium, and the other 4 percent boron, by weight, are placed in an alumina crucible together and heated to 1400° C. for one hour under an argon atmosphere. Mixing of the melted alloys occurred through diffusion and thermal effects. The experiment is performed at 1400° C. to ensure that all of the titanium and boron are dissolved, thereby allowing the titanium diboride to fully precipitate, being considerably less soluble than the individual elements. Subsequent SEM/EDS analysis of the composite produced identified a submicron $TiB_2$ dispersion in the aluminum matrix. While this experiment is intended to completely dissolve the titanium aluminide and aluminum boride, such that all the titanium and boron are held in solution in the aluminum, it is recognized that because of its limited solubility titanium diboride would precipitate at any temperature above the melting point of the solvent metal, even if all of the alloys are not dissolved.

EXAMPLE 4

To support the contention that it is not necessary to fully dissolve the titanium and boron in the alloys, three equivalent experiments to Example 3, are performed, except that the maximum temperatures achieved are limited to 1200° C., 1000° C. and 800° C., respectively. As in Example 3, finely dispersed $TiB_2$ particles are observed in the aluminum matrix in all cases.

The following Example 5 describes the production of aluminum/titanium diboride composites by alloy-alloy reaction, in the plasma arc.

EXAMPLE 5

In this example, the reaction is achieved by striking an arc between two electrodes, each containing the solvent metal and one of the reactive species, in a closed vessel. The relative positions of the electrodes is adjusted to achieve passage of the arc. The electrodes may also be rotated as to achieve even melting. Atomizing the homogenized molten metal into powder can be achieved in air, but is preferably performed in a nonreactive atmosphere, such as an inert gas or a vacuum. Alternatively, the molten metal may be collected in a heated container placed below the arc to obtain an ingot.

The reaction between the ceramic constituents within the arc yields a ceramic compound which is mixed with the intermediate matrix metal. Due to the very rapid heat-up and cool-down rates associated with this process, a distribution of very fine ceramic particles in the intermediate metallic matrix is achieved. Striking an arc in the above manner between two electrodes, one of which contains aluminum and titanium and the other aluminum and boron, results in the formation of a fine dispersion of titanium diboride in a molten aluminum droplet which solidifies as it drops through the inert gas. The powder thus produced can be subsequently processed by conventional powder metallurgical techniques to form a compact. In a different variant of this process, the molten metal droplets are collected in a heated crucible to produce an ingot, suitable for admixture with a molten host metal.

The following example teaches the influence of amorphous boron on the particle size of titanium diboride precipitated in an aluminum matrix.

EXAMPLE 6

An identical mixture (but for the use of amorphous boron instead of crystalline boron) as that described in Example 1 is prepared (that is, approximately 34 percent by weight of titanium, 16 percent by weight of boron, and 50 percent by weight of aluminum), compacted, and heated in a furnace. At a temperature of about 620° C., a rapid exotherm is noted. Subsequent examination revealed a distribution of very fine (0.01–1.0 micron) titanium diboride particles in an aluminum matrix.

The high concentration composite prepared in either Example 1 or Example 6 is suitable for use as an intermediate material for dispersion hardening of metal/alloy systems.

The following examples teach the use of one solvent metal to induce precipitation in a second, higher melting point solvent metal.

EXAMPLE 7

A mixture of 16 percent by weight of aluminum, 56 percent by weight of chromium, 20.6 percent by weight titanium, and 9.4 percent by weight of boron is compacted and subsequently heated in a furnace. On attainment of a temperature of about 620° C., a rapid reaction occurred, resulting in a temperature increase to over 800° C. and melting of the chromium. The temperature-time curve showed a double peak, indicating an exothermic reaction in aluminum (which typically occurs between 600–680° C.) and a subsequent reaction in the chromium. The lower melting solvent metal therefore acts as a "low temperature initiator" for the reaction, which releases heat and induces further reaction in the higher melting compound. The composite produced is identified as titanium diboride in a matrix of chromium-aluminum alloy.

EXAMPLE 8

A mixture of 20.6 percent by weight of titanium, 9.4 percent by weight boron and 70 percent by weight of chromium is compacted to 40,000 pounds per square inch, and then heated in a furnace. A rapid exothermic reaction is noted at approximately 880° C. This temperature is about 260° C. above that at which the same proportions of titanium and boron react when 20 percent of the mixture is composed of aluminum. As in the case of Example 7, titanium diboride is identified by X-ray analysis.

The following examples illustrate various characteristics and aspects of the invention as discussed hereinabove.

EXAMPLE 9

An experiment is conducted whereby zirconium diboride is precipitated in a matrix of copper. A mixture of approximately 24 percent zirconium, 11 percent boron, and 65 percent aluminum powders by weight is compacted, and then heated in a furnace. On attainment of a temperature of 830° C., rapid reaction occurs to a temperature maximum of about 970° C. Subsequent X-ray and SEM analysis shows the presence of zirconium diboride in a copper intermediate matrix.

EXAMPLE 10

An experiment is conducted whereby molybdenum disilicide is precipitated in an aluminum matrix. A mixture of approximately 7.5 percent silicon, 12.5 percent molybdenum, and 80 percent aluminum powders by weight is compacted and subsequently heated in a furnace. On attainment of a temperature of approximately 640° C., a sudden exotherm is noted. Subsequent X-ray and SEM analyses confirms the presence of molybdenum disilicide in an aluminum intermediate matrix.

EXAMPLE 11

A mixture of 20.4 percent titanium, 9.6 percent boron and 70 percent by weight of lead is compacted to 40,000 pounds per square inch and then heated to 450° C. No exotherm is noted and subsequent X-ray analysis identifies only the unreacted elemental powders. This behavior illustrates, as others have shown, that there is no solubility of boron in lead, and thus no diffusion of boron in the lead can occur to react with the titanium. In contrast to such behavior, a silicon, titanium and lead mixture does produce titanium disilicide in lead, as both silicon and titanium have a finite solubility in lead which enables diffusion and reaction to occur.

EXAMPLE 12

A mixture of nickel, aluminum, titanium and boron in the stoichiometric proportions for the formation of nickel aluminide ($Ni_3Al$) and titanium diboride ($TiB_2$), that is, 10 percent by weight aluminum, 62 percent by weight nickel, 19 percent by weight titanium and 9 percent by weight boron, are compacted to 40,000 pounds per square inch, and then heated in a furnace. Upon reaching 620° C, a rapid exotherm is noted, which subsequent analysis by X-ray diffraction and scanning electron microscopy identifies as resulting from the formation of titanium diboride particles in a nickel-aluminum intermediate matrix. It is evident from this experiment that a ceramic phase, for example, titanium diboride, could be precipitated in an intermetallic phase, for example, nickel aluminide, provided the affinity of the ceramic-forming species for each other is greater than either has for the two elements making up the intermetallic matrix.

The following example teaches the preparation of a second phase in the form of an intermediate material and its subsequent addition to host metal.

EXAMPLE 13

Titanium, amorphous boron, and aluminum metal powders are combined in the appropriate proportions to produce two titanium diboride - aluminum composites, having titanium diboride concentrations of about 23 weight percent and 60 weight percent, respectively. After conducting the solvent assisted precipitation reaction, SEM analyses of the resultant composites indicates a size range for the titanium diboride particles of about 0.01 to 0.1 microns. Because the initial powders are not degassed prior to the precipitation reaction, the porosities of the resultant composites are relatively high, that is, in the range of 10-30 percent. The intermediate material with 23 percent titanium diboride is mixed with an equal weight of solid host aluminum, and then heated to about 750° C. so as to melt the host aluminum. This admixture of intermediate material and host aluminum yields a composite containing about 12 weight percent of the titanium diboride ceramic phase.

A melt of host 7075 aluminum alloy is then prepared; and the intermediate material containing 60 weight percent titanium diboride is immersed therein, in a ratio of three parts host alloy to one part intermediate material. The composite is wet and melted by the molten host metal alloy. The resultant composite, containing about 15 percent titanium diboride in final 7075 aluminum alloy matrix, is then cast in a conventional manner. Subsequent SEM analysis confirms a uniform distribution of titanium diboride particles throughout the matrix of approximately the same size as those observed in the intermediate material, that is, there is no evidence of particle growth during casting. In addition, there is no indication of agglomeration of the titanium diboride particles, and the residual porosity of the as-cast composite is less than 1 percent.

EXAMPLE 14

This example illustrates the ability of the present process to introduce a second phase in a final matrix other than the one it was formed in. Elemental powders of titanium, boron, and aluminum are mixed in the proper ratios to achieve 60 volume percent titanium diboride in an intermediate aluminum matrix, compacted isostatically to 42 ksi, and heated in an induction furnace to approximately 660° C. to initiate a second phase-forming exothermic reaction. The recovered intermediate material, through X-ray and STEM analysis, is found to comprise titanium diboride particles, having an average size of 1.4 microns, dispersed in an aluminum intermediate matrix. This intermediate is then crushed to minus 100 mesh, mixed with appropriate amounts of titanium and aluminum to form ten volume percent of particles within either a single-phase titanium aluminide, TiAl, matrix (alloy 54, containing 54 atom percent aluminum), or a two-phase titanium aluminide matrix, $Ti_3Al$ plus TiAl (alloy 45, containing 45 atom percent aluminum). This material is then compacted, and the mixture heated to exceed the melting point of the titanium under a flowing argon atmosphere. X-ray diffraction, STEM and SEM analysis reveals that the recovered product consists of a titanium aluminide final matrix containing a uniform dispersion of titanium diboride particles having an average size of 1.5 microns.

EXAMPLE 15

14.7 kilograms of aluminum, 226 grams of silicon master alloy (50 percent Si in Al) and 756 grams of magnesium master alloy (25 percent Mg in Al) are heated to 800° C. to form a molten host metal bath. Elemental powders of titanium, boron, and aluminum are mixed for 30 minutes in a ball mill, compacted isostatically to 40,000 psi, and heated in an induction furnace to approximately 660° C. to initiate a second phase-forming exothermic reaction to produce an intermediate material containing 60 weight percent titanium diboride second phase in an aluminum intermediate matrix. 7,878 grams of the intermediate material are added to the molten host metal while mechanically stirring. The melt is stirred for 5 minutes, allowed to stand for 10 minutes, and stirred for an additional 5 minutes. The resultant composite is then cast in conventional manner. Subsequent chemical analysis reveals a final composite comprising 20 weight percent titanium diboride in a 6061 aluminum alloy final metal matrix.

The following example demonstrates the ability of additional boron, when added to host aluminum, to bond with unreacted titanium which may be present in the intermediate material, thereby substantially eliminating the formation of titanium aluminide and improving viscosity.

EXAMPLE 16

1,300 grams of intermediate material, prepared as in example 15, containing 60 weight percent titanium diboride in an aluminum intermediate matrix, are crushed, and then mixed with 52 grams of powdered boron and subsequently added to 2,196 grams of molten host aluminum. The melt is stirred to aid in the admixture of the boron powder. As the boron is mixed, the viscosity of the melt decreases. The resultant composite is then cast in a conventional manner. Optical microscopy of the final composite reveals 15 volume percent titanium diboride second phase in an essentially pure aluminum final matrix, with substantially no titanium aluminide present.

The purpose of the following example is to demonstrate that boron master alloy can be used for the same purpose as described above for elemental boron.

EXAMPLE 17

1,000 grams of boron master alloy (3.7 percent B in Al) are added to 730 grams of molten aluminum. 650 grams of intermediate material, prepared as in example 15, containing 60 weight percent titanium diboride in an aluminum intermediate matrix, are added to the molten bath. An additional 410 grams of boron master alloy are added to the molten bath, followed by the addition of 650 more grams of intermediate material. The resultant composite is then cast in a conventional manner. Optical microscopy reveals a final composite comprising 15 volume percent titanium diboride in an aluminum final matrix with substantially no titanium aluminide present.

The purpose of the following example is to demonstrate that boron master alloy works equally well in copper containing melts.

EXAMPLE 18

1,203 grams of copper master alloy (20 percent Cu in Al) and 960 grams of boron master alloy (3.7 percent B in Al) are added to 1,096 grams of molten aluminum. The temperature of the melt is raised to 750° C., and 1,322 grams of crushed intermediate material, prepared as in example 15, containing 60 weight percent titanium diboride second phase in an aluminum intermediate matrix, are added while stirring. The resultant composite is cast in a conventional manner. Optical microscopy of the final composite reveals 10 volume percent titanium diboride second phase in an aluminum-copper alloy final metal matrix with only a very small amount of titanium aluminide present.

The following example demonstrates the ability of amorphous boron to lower melt viscosity to a greater extent than crystalline boron.

EXAMPLE 19

Two identical host metal baths are prepared by melting 1,096 grams of aluminum, adding 1,200 grams of copper master alloy (20 percent Cu in Al) and 960 grams of boron master alloy (3.7 percent B in Al), and heating to 750° C. 1,322 grams of intermediate material, prepared as in example 15, containing 60 weight percent titanium diboride in an aluminum intermediate matrix, are mixed with 26 grams of amorphous boron and added to one of the host metal baths. Another 1,322 grams of intermediate material, prepared as in example 15, of identical composition, are mixed with 26 grams of crystalline boron and added to the other host metal bath. The viscosity of the melt prepared with amorphous boron is noticeably less than the melt prepared with crystalline boron. The melts are then filtered through ceramic cloth with approximately 2,800 grams of the melt prepared with amorphous boron and 1,800 grams of the melt prepared with crystalline boron passing through.

The following example demonstrates the ability to substantially eliminate the formation of titanium aluminide during the production of a titanium diboride/aluminum intermediate material by adding excess boron.

EXAMPLE 20

Five powder mixtures are prepared containing stoichiometric excesses of boron of 2, 7, 12, 15, and 22 weight percent over the proper proportions necessary to produce intermediate material comprising 60 weight percent titanium diboride in aluminum. The mixtures are isostatically pressed to 45,000 psi and then heated in a quartz tube under flowing argon using an induction coil to initiate an exothermic reaction. The resultant intermediate materials are analyzed for the presence of titanium aluminide using X-ray diffraction. The 2 weight percent excess boron mixture produced an intermediate material containing 5.5 volume percent titanium aluminide; the 7 weight percent excess boron mixture produced 2 volume percent titanium aluminide; the 12 weight percent excess boron mixture produced an insignificant amount of titanium aluminide; the 15 and 22 weight percent excess boron mixtures produced intermediate materials containing no trace of titanium aluminide.

The following example illustrates the ability to disperse titanium carbide second phase particles throughout an aluminum matrix and the use of excess carbon to substantially eliminate the formation of titanium aluminide.

EXAMPLE 21

A sample is prepared by mixing titanium, carbon, and aluminum powders in the proper stoichiometric proportions to achieve 60 weight percent titanium carbide in an aluminum intermediate matrix. A second sample is prepared as above with the addition of 1 weight percent excess carbon to avoid the formation of titanium aluminide. The samples are isostatically pressed to 45,000 psi, and then heated in a quartz tube under flowing argon using an induction coil and susceptor to initiate an exothermic reaction. The compositions of the resultant intermediate materials are analyzed using X-ray diffraction. Both intermediate materials are shown to contain titanium carbide and aluminum in large amounts with the stoichiometric carbon sample containing a small amount of titanium aluminide and the 1 weight percent excess carbon sample containing no trace of titanium aluminide. Each of the samples is then added to molten aluminum in the proper proportion to yield approximately 10 volume percent titanium carbide second phase in aluminum final matrix. The resultant composites are then cast in conventional manner. Optical microscopy shows good dispersion of titanium carbide particles in aluminum for both final composites with the composite prepared using stoichiometric carbon containing a small amount of titanium aluminide and the composite prepared using 1 weight percent excess carbon containing no trace of titanium aluminide.

EXAMPLE 22

Titanium and boron carbide second phase-forming constituents are reacted in the presence of aluminum solvent metal in the proper proportions to form a first intermediate material containing 80 weight percent second phase in an aluminum intermediate matrix. Titanium and boron second phase-forming constituents are reacted in the presence of aluminum solvent metal in the proper proportions to form a second intermediate material containing 80 weight percent second phase in an aluminum intermediate matrix. 215 grams of each intermediate material are added to 2,268 grams of molten host aluminum at 850° C. and stirred. The resultant composite is then cast in conventional manner. Analysis of the final composite reveals the presence of titanium diboride and titanium carbide in aluminum at a total of 13 volume percent.

The following example illustrates the ability to disperse a zirconium boride second phase in a beryllium-copper alloy.

EXAMPLE 23

A mixture of approximately 40 percent zirconium, 20 percent boron and 40 percent copper powders by weight is compacted and then heated in a furnace until a rapid exothermic reaction occurs. X-ray and SEM analysis of the resultant intermediate material show the presence of zirconium diboride in a copper intermediate matrix. Approximately 80 grams of this intermediate material are subsequently added to 1,000 grams of molten beryllium. Analysis of the resulting composite reveals zirconium boride second phase particles dispersed in a final beryllium-copper alloy matrix.

EXAMPLE 24

150 grams of titanium powder, 75 grams of boron nitride powder, and 150 grams of copper powder are mixed, compacted, and then heated above the melting point of copper to initiate an exothermic reaction and form an intermediate material. Analysis of the intermediate material composition reveals the presence of titanium diboride and titanium nitride second phases in an intermediate copper matrix. The intermediate material is then added to molten host beryllium at a ratio of one part intermediate material to ten parts beryllium. The resulting composite is then cast in conventional manner. Subsequent analysis reveals titanium nitride second phase dispersed in a final beryllium-copper alloy matrix.

The following example demonstrates the improved ability of aluminum-lithium host metal over pure aluminum host metal to wet a titanium diboride/aluminum intermediate material.

EXAMPLE 25

1,500 grams of intermediate material, prepared as in example 15, containing 60 weight percent titanium diboride in an aluminum intermediate matrix with 15 weight percent excess boron added thereto, are placed at the bottom of a crucible. 500 grams of lithium master alloy containing 10 weight percent lithium in aluminum are then added to the crucible followed by 4,000 grams of pure aluminum. The sample is then heated in an induction furnace under an argon atmosphere at a reduced pressure of 5 inches of mercury. The lithium master alloy is observed to melt first, followed by the aluminum. As the aluminum melts to the bottom of the crucible, it is seen to wet the intermediate material fairly well. After complete melting the charge is stirred and the intermediate material is broken-up as well as possible with a scooper. The resulting composite is then cast in conventional manner and cooled under argon. Another composite is prepared exactly as above except the 500 grams of lithium master alloy are replaced by 500 grams of pure aluminum. SEM analysis of the two castings shows a higher loading of second phase titanium diboride particles in the final metal matrix containing lithium than in the pure aluminum final matrix.

The following example illustrates the use of ultrasonic agitation to facilitate dispersion of second phase titanium diboride particles throughout an aluminum final metal matrix.

EXAMPLE 26

Two host metal baths of molten aluminum are prepared in small crucibles (2 in. dia. by 4 in. high). Intermediate material, as prepared in example 15, containing 60 weight percent titanium diboride in an aluminum intermediate matrix, is crushed and then stirred into each crucible in the proper proportions to form a final composite having 10 weight percent titanium diboride in an aluminum final matrix. One of the melts is then ultrasonically agitated while the other remains unagitated. SEM analysis of the resulting composites shows a more even dispersion with fewer agglomerations of the titanium diboride particles in the ultrasonically agitated material compared to the non-ultrasonically agitated material.

EXAMPLE 29

Commercial titanium diboride powder (minus 325 Tyler Mesh) is admixed and ball-milled with aluminum powder to form a mixture of 60 weight percent titanium diboride in aluminum. 700 grams of this mixture is packed into tubing and isostatically compressed. Pieces of the resultant compacted rod are then added to 3,000 grams of molten aluminum. The melt is stirred, superheated to 900° C. and stirred again. However, the rod pieces do not break up. As the melt is poured, the aluminum runs out, leaving behind the pieces of the rod with no dispersion of the titanium diboride in the aluminum.

Additional experiments are conducted to produce a variety of intermediate materials, as set forth in Table I which follows.

TABLE I

| Ceramic Phase (wt %) | Matrix | Reactants (wt %) | Initiation Temp. °C. | Maximum Temp. °C. | Particle Size (um) |
|---|---|---|---|---|---|
| TiB$_2$-100 | None | Ti-69, B-31 | No Reaction up to 1200° | | |
| TiB$_2$-95* | Al | Ti-65.6, B-29.4, Al-5.0 | 580 | 730 | |
| TiB$_2$-90 | Al | Ti-62, B-28, Al-10 | 580 | 1120 | |
| TiB$_2$-80 | Al | Ti-55.2, B-24.8, Al-20 | 590 | 1625 | 1–3 |
| TiB$_2$-60 | Al | Ti-41.4, B-18.6, Al-40 | 680 | 1450 | 1–3 |
| TiB$_2$-50 | Al | Ti-35, B-15, Al-50 | 780 | 1488 | 1–5 |
| TiB$_2$-40 | Al | Ti-27.6, B-12.4, Al-60 | 680 | 1380 | |
| TiB$_2$-32 | Al | Ti-22, B-10, Al-68 | 780 | 1200 | 1–5 |
| TiB$_2$-30 | Al,Mg | Ti-20, B-5, Mg-5, Al-70 | N/A | N/A | 0.1–5 |
| TiB$_2$-21 | Al,Zn,Mg,Cu | Ti-14.5, B-6.7, Zn-6, Mg-5, Cu-1, Al-68 | N/A | N/A | 0.1–5 |
| TiB$_2$-60 | Al—Mg | Ti-41.4, B-18.6, Al—Mg-40 | 610 | 1350 | 1–2 |
| TiB$_2$-47.5 | Al—Mg,Zn,Cu | Ti-33, B-14.5, Zn-3.2, Cu-0.5, Al—Mg-48.8 | 610 | Thermocouple Failed | |
| TiB$_2$-28 | Al—Mg,Zn,Cu | Ti-19.3, B-8.8, Zn-5.6, Cu-0.9, Al—Mg-65.4 | 600 | 905 | 1.0 |
| TiB$_2$-22 | Al—Mg,Zn,Cu | Ti-14.5, B-7.1, Zn-6, Cu-1, Al—Mg-71.4 | N/A | N/A | <0.1–2 |
| TiB$_2$-21 | Al—Mg,Zn,Cu | Ti-14.6, B-6.8, Zn-6, Cu-1, Al—Mg-71.6 | 680~ | 1000 | <0.1 |
| Zr$_5$Si$_3$-30 | Al | Zr-18.6, Si-11.4, Al-70 | 570 | 870 | |
| ZrB$_2$-26 | Al | Zr-21, B-5, Al-74 | N/A | N/A | 0.5–5 |
| ZrB$_2$-24 | Al,Mg | Zr-19, B-5, Mg-7, Al-69 | N/A | N/A | 0.1–1.5 |
| Zr$_5$Si$_3$-35 | Al | Zr-23.5, Si-10.5, Al-66 | 570 | 870 | |
| MgB$_2$-30 | Al | Mg-15.8, B-14.2, Al-70 | No Reaction | | |
| MoSi$_2$-20 | Al | Mo-12.6, Si-7.4, Al-80 | N/A | N/A | 0.01–5 |
| MoB$_2$-27 | Al | Mo-22, B-5.4, Al-73 | N/A | N/A | 0.01–3 |
| MoB$_2$-25 | Al,Mg | Mo-20, B-5, Mg-7, Al-68 | N/A | N/A | 0.01–3 |
| WC-30 | Al | W-28.2, C-1.8, Al-70 | 640 | 700 | 0.15–1 |
| Cr$_3$C$_2$-30 | Al | Cr-24.4, C-5.6, Al-70 | 630 | 720 | |
| VSi$_2$-60 | Al | V-28.6, Si-31.4, Al-40 | 820 | 1300 | |
| VC-60 | Al | V-48.6, C-11.4, Al-40 | 780 | 860 | |
| VB$_2$-60 | Al | V-42.2, B-17.8, Al-40 | 700 | 860 | 0.25–1** |
| TiB$_2$-80 | Cu | Ti-55.2, B-24.8, Cu-20 | 580 | 1290 | <0.1–1.5 |
| TiB$_2$-30 | Cu | Ti-20.6, B-9.4, Cu-70 | 820 | 1320 | <0.1–2.0 |
| TiB$_2$-30 (Hot Pressed) | Cu | Ti-20.6, B-9.4, Cu-70 | 780 | 1240 | 0.1–0.5 |
| TiB$_2$-23 | Cu,Zn | Ti-15.8, B-7.2, Zn-23.1, Cu-53.8 | 820 | 1190 | <0.5 |
| SiC-60 | Cu | Si-42, C-18, Cu-40 | N/A | N/A | |
| ZrB$_2$-30 | Cu | Zr-24.2, B-5.8, Cu-70 | 830 | 870 | <0.2–1 |
| ZrB$_2$-60 | Cu | Zr-48.6, B-11.4, Cu-40 | 870 | 1100 | |
| ZrSi$_2$-30 | Cu | Zr-18.6, Si-11.4, Cu-70 | 770 | 940 | 0.05–0.5 |
| Cr$_3$C$_2$/Cr$_7$C$_3$-60 | Cu | Cr-52, C-8, Cu-40 | N/A | N/A | |
| Mo$_2$C-60 | Cu | Mo-56.4, C-3.6, Cu-40 | N/A | N/A | |
| MoSi$_2$-30 | Cu | Mo-19, Si-11, Cu-70 | 760 | 780 | <0.1–0.5 |
| VC-60 | Cu | V-48.6, C-11.4, Cu-40 | 1020 | 1140 | |
| VB$_2$-60 | Cu | V-42.2, B-17.8, Cu-40 | 1020 | 1230 | |
| AlTi$_2$-60 | Cu | Ti-50.6, Al-9.4, Cu-40 | 510 | 830 | |
| TiB$_2$-30 | Cr | Ti-20.6, B-9.4, Cr-70 | 880 | >1100 | |
| TiB$_2$-30 | Fe | Ti-20.7, B-9.3, Fe-70 | N/A | N/A | <0.1–1.0 |
| TiB$_2$-30 (Hot Pressed) | Fe | Ti-20.7, B-9.3, Fe-70 | 1150 | 1300 | 0.1–0.5 |
| Mo$_5$Si$_3$-30 | Fe | Mo-19, Si-11, Fe-70 | 1060 | 1130 | |
| TiB$_2$-30 | Mg | Ti-20.7, B-9.3, Mg-70 | N/A | N/A | <0.1 |
| TiSi$_2$-32 | Mg | Ti-14.6, Si-17.1, Mg-68.3 | 350 | 490 | |
| ZrC-60 | Ni | Zr-47.6, C-12.4, Ni-40 | N/A | N/A | |
| TiB$_2$, Ti$_2$Ni-60 | Ni | Ti-20.6, B-9.4, Ni-70 | N/A | N/A | |
| TiC-60 | Ni | Ti-48, C-12, Ni-40 | 1000 | 1370 | |
| TiB$_2$-30 | Cr—Al | Ti-20.6, B-9.4, Al-14, Cr-56 | 620 | 1400 | |
| TiB$_2$-30 | Co—Al | Ti-20.6, B-9.4, Al-14, Co-56 | 590 | 1080 | 0.1–1.5 |
| TiB$_2$-30 | Ni—Al | Ti-20.6, B-9.4, Al-14, Ni-56 | 600 | 1600 | |
| TiB$_2$-30 | Co | Ti-20.6, B-9.6, Co-70 | 800 | 1400 | |
| TiC-60 | Co | Ti-48, C-12, Co-40 | 1050 | >1450 | 0.1–0.3 |
| TiSi$_2$-60 | Co | Ti-27.6, Si-32.4, Co-40 | N/A | N/A | |
| ZrB$_2$-60 | Co | Zr-48.2, B-11.7, Co-40 | 900 | >1500 | |
| ZrSi$_2$-60 | Co | Zr-37.2, Si-22.8, Co-40 | 930 | Thermocouple failed | |
| Mo$_5$Si$_3$-60 | Co | Mo-37.8, Si-22.2, Co-40 | 970 | 1070 | |
| WC-60 | Co | W-56.4, C-3.6, Co-40 | N/A | N/A | |
| WSi$_2$-60 | Co | W-46.0, Si-14.0, Co-40 | 980 | 1080 | |
| TiB$_2$-30 | MarM322*** | Ti-20.6, B-9.4, MarM-70 | 920 | 1330 | |
| TiB$_2$-40 | 316 Stainless+ | Ti-26.4, B-13.6, 316-60 | 960 | Thermocouple failed | |
| TiB$_2$-40 | 304 Stainless+ | Ti-26.4, B-13.6, 304-60 | 960 | Thermocouple failed | |
| TiB$_2$-30 | Si | Ti-20.6, B-9.4, Si-70 | N/A | N/A | 0.5–2 |
| TiB$_2$-24++ | Ti | Ti-90, B-10 | N/A | N/A | 5–100 |
| TiB$_2$-31++ | Ti,V | Ti-81, B-13, V-6 | N/A | N/A | |
| AlZr$_2$-30 | Pb | Zr-27.4, Al-2.6, Pb-70 | N/A | N/A | |
| TiSi$_2$-30 | Pb | Ti-13.8, Si-16.2, Pb-70 | 440 | 480 | |
| AlTi$_2$-30 | Pb | Ti-11.2, Al-18.8, Pb-70 | 300 | 380 | |

*Ceramic phase not formed
**Whiskers formed also
***Nickel superalloy (Martin Marietta trademark)
+Stainless steel (AISI designation)
++Not fully reacted A very wide range of metal-second phase composites having widely variant particulate concentrations may be obtained by adding intermediate materials to host metals. Generally, no difficulties are encountered in preparing, from second phase intermediate materials as set forth in Table I, metal-second phase composites having very low concentrations (for example, 1 percent or less) of second phase particles, typically less than 1 micron in diameter.

It is noted that the present invention has a number of advantages over methods taught by the prior art. For example, this invention circumvents the need for submicron, unagglomerated refractory metal boride starting materials, which materials are not commercially available, and are often pyrophoric. This invention also eliminates the technical problems of uniformly dispersing a second phase in a molten metal, and avoids the problem of oxide or other deleterious layer formation at the second phase/metal interface during processing. Further, the present invention yields a metal-second phase composite having superior hardness and modulus qualities over currently employed composites, such as SiC/aluminum. The metal-second phase composite of the present invention also has improved high temperature stability, in that the second phase is not reactive with the final metal matrix. Further, as opposed to composites presently available, the metal-second phase composite of the present invention can be remelted and recast while retaining fine grain size, fine particle size, and the resultant superior physical properties of the material.

Further still, the metal-second phase composite can be welded without degradation of material properties, and after welding possesses superior corrosion resistance, when compared to metal matrix composites presently available.

It is understood that the above description of the present invention is susceptible to considerable modification, change, and adaptation by those skilled in the art, and such modifications, changes, and adaptations are intended to be considered to be within the scope of the present invention, which is set forth by the appended claims.

We claim:

1. A method for the production of metal-second phase composite materials, the method comprising producing a precipitate of at least one second phase material in an intermediate metal matrix by contacting reactive second phase-forming constituents, in the presence of a substantially nonreactive solvent metal in which the second phase-forming constituents are more soluble than the second phase material, at a first temperature at which sufficient diffusion of the reactive second phase-forming constituents into the solvent metal occurs to cause the second phase-forming reaction of said constituents to thereby precipitate second phase particles in the solvent metal, producing an intermediate material comprising finely divided second phase particles in the intermediate metal matrix, and forming a molten mass, by introducing the intermediate material into a molten host metal in which said second phase particles are substantially insoluble at a second temperature at which said intermediate metal matrix is dissolved in said host metal, said host metal comprising a metal, metal alloy, or intermetallic, achieving a substantially uniform dispersion of second phase in a final metal matrix, and recovering a product.

2. The method as set forth in claim 1 wherein the uniform dispersion is achieved by agitating the molten mass.

3. The method as set forth in claim 1 wherein the uniform dispersion is achieved by maintaining the molten mass in the liquid state to substantially disperse the second phase.

4. The method as set forth in claim 1, wherein the intermediate material is cooled to a solid before further processing, said solid being wettable by the molten host metal.

5. The method as set forth in claim 4 wherein the intermediate material is crushed before further processing.

6. The method as set forth in claim 1, wherein the second phase particles are wetted by and substantially unreactive with the molten host metal.

7. The method as set forth in claim 1, wherein one of the second phase-forming constituents is contacted in greater than stoichiometric proportion with another of the second phase-forming constituents.

8. The method as set forth in claim 1, wherein the intermediate material is admixed with solid host metal before being heated to said second temperature.

9. The method as set forth in claim 1, wherein the intermediate material is added to host metal heated to above the melting point of said host metal.

10. The method as set forth in claim 1, wherein said first temperature is about the melting temperature of the solvent metal.

11. The method as set forth in claim 1, wherein said second temperature is above the melting temperature of the host metal.

12. The method as set forth in claim 1, wherein the reactive second phase-forming constituents and the substantially nonreactive solvent metal are provided as individual elements.

13. The method as set forth in claim 12, wherein the second phase-forming reaction is initiated in the solid state.

14. The method as set forth in claim 12, wherein the second phase-forming reaction occurs in the liquid state.

15. The method as set forth in claim 1, wherein at least one second phase-forming constituent is provided as an alloy of the solvent metal.

16. The method as set forth in claim 15, wherein the second phase-forming reaction takes place in the liquid state.

17. The method as set forth in claim 15 wherein the second phase-forming reaction takes place in a plasma state.

18. The method as set forth in claim 1, wherein at least one second phase-forming constituent is provided as an alloy of the solvent metal, and at least one other second phase-forming constituent is provided as an individual element.

19. The method of claim 1, wherein the second phase is titanium diboride, titanium carbide, zirconium diboride, zirconium disilicide, or titanium nitride.

20. The method of claim 1, wherein the second phase particles are substantially less than 5 microns in size.

21. The method of claim 1, wherein the second phase-forming constituents are contacted in stoichiometric proportions.

22. The method of claim 1, wherein the second phase is a ceramic.

23. The method of claim 1, wherein the second phase is an intermetallic.

24. The method as set forth in claim 1, wherein additional alloying material is added to the intermediate material prior to mixing of the intermediate material with the host metal.

25. A method for dispersion of second phase particles in a metallic matrix, the method comprising steps of:
   (a) preparing a mixture of reactive second phase-forming constituents and a substantially nonreactive solvent metal in which the second phase-forming constituents are more soluble than the second phase;
   (b) heating the mixture to a reaction initiation temperature approximating the melting point of the solvent metal to initiate an exothermic reaction,
   (c) permitting the exothermic reaction to further heat the mixture, consuming the second phase-forming constituents to form a distribution of second phase particles in an intermediate metal matrix;
   (d) recovering an intermediate material;
   (e) introducing the intermediate material into a host metal in which said second phase particles are substantially insoluble, said host metal comprising a metal, metal alloy or intermetallic; and
   (f) mixing.

26. The method as set forth in claim 25, wherein at least one second phase-forming constituent is a transition metal of the third to sixth groups of the Periodic Table.

27. The method as set forth in claim 25, wherein at least one second phase-forming constituent is aluminum, titanium, silicon, boron, carbon, sulfur, tantalum, thorium, yttrium, cobalt, nickel, molybdenum, tungsten, vanadium, zirconium, niobium, hafnium, magnesium, scandium, lanthanum, chromium, oxygen, nitrogen, lithium, beryllium, iron, manganese, zinc, tin, copper, silver, gold, platinum or a rare earth element.

28. The method as set forth in claim 27, wherein the solvent metal is aluminum, nickel, titanium, copper, vanadium, chromium, manganese, cobalt, iron, silicon, molybdenum, beryllium, silver, gold, platinum, niobium, tantalum, hafnium, zirconium, magnesium, lead, zinc, tin, tungsten, antimony, bismuth, or an alloy of such metals.

29. The method as set forth in claim 25, wherein the second phase-forming constituents and the solvent metal are provided as individual elements.

30. The method as set forth in claim 29, wherein the reaction takes place in the liquid state.

31. The method as set forth in claim 30, wherein the solvent metal is aluminum, zinc, magnesium, copper, lead, nickel, chromium, iron, titanium, cobalt, or an alloy of such metals.

32. The method as set forth in claim 31, wherein at least one second phase-forming constituent is aluminum, silicon, titanium, hafnium, tantalum, zirconium, magnesium, vanadium, nickel, or tungsten.

33. The method as set forth in claim 32, wherein at least one other second phase-forming constituent is aluminum, boron, silicon, nitrogen, or carbon.

34. The method as set forth in claim 25, wherein the second phase-forming constituents are each provided as an alloy of the solvent metal.

35. The method as set forth in claim 34, wherein the solvent metal is aluminum, zinc, magnesium, copper, lead, nickel, chromium, iron, titanium, cobalt, or an alloy of such metals.

36. The method as set forth in claim 35, wherein at least one second phase-forming constituent is aluminum, titanium, zirconium, magnesium, boron, silicon, or carbon.

37. The method as set forth in claim 35, wherein the solvent metal is aluminum or an alloy thereof.

38. The method as set forth in claim 37, wherein at least one second phase-forming constituent is titanium, zirconium, magnesium, boron, silicon, or carbon.

39. The method as set forth in claim 34, wherein the second phase material is selected from titanium diboride and titanium carbide and the solvent metal is aluminum.

40. The method as set forth in claim 25, wherein at least one second phase-forming constituent is provided as an individual element, and at least one second phase-forming constituent is provided as an alloy of the solvent metal.

41. The method as set forth in claim 40, wherein the solvent metal is aluminum, zinc, magnesium, copper, lead, nickel, chromium, iron, titanium, cobalt, or an alloy of such metals.

42. The method as set forth in claim 41, wherein the second phase-forming constituents are selected from aluminum, titanium, zirconium, magnesium, boron, silicon, and carbon.

43. The method as set forth in claim 42, wherein the solvent metal is aluminum and the second phase-forming constituents are titanium and boron.

44. The method as set forth in claim 42 wherein the solvent metal is aluminum and the second phase-forming constituents are titanium and carbon.

45. The method of claim 25, wherein the second phase is titanium diboride, titanium carbide, zirconium diboride, zirconium disilicide, or titanium nitride.

46. The method of claim 25, wherein the second phase is substantially submicron in size.

47. The method of claim 25, wherein the second phase-forming constituents are contacted in stoichiometric proportions.

48. The method of claim 25, wherein one of the second phase-forming constituents is added to the mixture in stoichiometric excess.

49. The method of claim 25, wherein the second phase is a ceramic.

50. The method of claim 25, wherein the second phase is an intermetallic.

51. The method as set forth in claim 25, wherein additional alloying material is added to the intermediate material prior to its addition to the host metal.

52. The method as set forth in claim 25 wherein an additional aaount of one of the second phase forming constituents is added to the host metal.

53. A method for the production of metal-second phase composite materials, said method comprising precipitating at least one second phase material in a solvent metal by contacting reactive second phase-forming constituents, in the presence of a substantially nonreactive solvent metal in which the second phase-forming constituents are more soluble than the second phase, at a temperature at which sufficient diffusion of the constituents into the solvent metal occurs to cause reaction of the reactive second phase-forming constituents, thereby increasing the temperature to a temperature exceeding the melting temperature of the solvent metal and precipitating the second phase in the solvent metal; recovering an intermediate material; mixing the thus produced intermediate material into a bath of a molten metal in which said second phase is substantially insoluble, metal alloy or intermetallic; and recovering a product.

54. A method for providing a second phase in a metallic matrix, the method comprising the steps of:
   (a) preparing a mixture of reactive second phase-forming constituents and a substantially nonreactive solvent metal in which the second phase-forming constituents are more soluble than the second phase;

(b) heating the mixture to a reaction initiation temperature approximating the melting point of the solvent metal to initiate an exothermic reaction;

(c) permitting the exothermic reaction to further heat the mixture to form an intermediate material comprising a uniform distribution of second phase particles in an intermediate metal matrix;

(d) introducing the intermediate material into a molten host metal and mixing, said host metal comprising metal, metal alloy, or intermetallic; and (e) recovering a product.

55. A method for dispersion of second phase dispersoids in a metallic matrix, the method comprising forming a reaction mixture of reactive second phase-forming constituents in the presence of at least two metals, at least one of which acts as a solvent metal in which the second phase-forming constituents are more soluble than the second phase dispersoids, raising the temperature of the reaction mixture to a temperature at which sufficient diffusion of the second phase-forming constituents into the lowest melting solvent metal occurs to initiate a reaction of the constituents, whereby the exothermic heat of reaction of the constituents causes the temperature of the reaction mixture to exceed the melting point of the highest melting metal, permitting dispersion of the second phase dispersoid in an alloy thereof; recovering an intermediate material comprising second phase dispersoids in an intermediate metal alloy matrix; and dissolving said intermediate metal alloy matrix in a molten host metal in which said dispersoids are substantialy insoluble and mixing said host metal comprising metal, metal alloy, or intermetallic.

56. A method for dispersion of second phase dispersoids in a metal matrix, the method comprising forming a reaction mixture of reactive second phase-forming constituents in the presence of at least two metals, at least one of which acts as a solvent metal in which second phase-forming constituents are more soluble than the second phase dispersoids, raising the temperature of the reaction mixture to a temperature at which sufficient diffusion of the second phase-forming constituents into the lowest melting solvent metal occurs to initiate a reaction of the constituents, whereby the exothermic heat of reaction of the constituents causes the temperature of the reaction mixture to exceed the melting point of the lowest melting point solvent metal, permitting dispersion of the second phase dispersoids in a mixed intermediate metal matrix, recovering an intermediate material, dissolving said intermediate metal matrix in a host metal in which said dispersoids are substantialy insoluble, and mixing, said host metal comprising metal, metal alloy, or intermetallic.

57. A method for dispersion of at least one intermetallic material in a metallic matrix, comprising steps of:

(a) preparing a mixture of reactive intermetallic-forming constituents and a substantially nonreactive solvent metal in which the intermetallic-forming constituents are aore soluble than the intermetallic material;

(b) heating the mixture to a reaction initiation temperature approximating the melting point of the solvent metal;

(c) permitting the resultant exothermic reaction to raise the temperature of the mixture to a temperature exceeding the melting point of the solvent metal and to consume the intermetallic-forming constituents;

(d) recovering an intermediate material;

(e) mixing said intermediate material with a molten host metal in which said dispersoids are substantially insoluble, said host metal comprising metal, metal alloy, or intermetallic; and (f) recovering a product.

58. A method for dispersion of at least one ceramic material in a metallic matrix, comprising steps of:

(a) preparing a mixture of reactive ceramic-forming constituents and a substantially nonreactive solvent metal in which the ceramic-forming constituents are more soluble than the ceramic material;

(b) heating the mixture to a reaction initiation temperature approximating the melting point of the solvent metal;

(c) permitting the resultant exothermic reaction to raise the temperature of the mixture to a temperature exceeding the melting point of the solvent metal and to consume the ceramic-forming constituents;

(d) recovering an intermediate material;

(e) mixing said intermediate material with a molten host metal in which said dispersoids are substantially insoluble, said host metal comprising metal, metal alloy, or intermetallic; and (f) recovering a product.

59. A method for dispersing dispersoid particles of an intermetallic material and a ceramic material in a metal matrix, the method comprising steps of:

(a) preparing a mixture of reactive intermetallic-forming and ceramic-forming constituents and a substantially nonreactive solvent metal in which said intermetallic-forming constituents and ceramic-forming constituents are more soluble than the intermetallic or the ceramic material, respectively;

(b) heating the mixture to a reaction initiation temperature approximating the melting point of the solvent metal;

(c) initiating an exothermic reaction to raise the temperature of the mixture to a temperature exceeding the melting point of the solvent metal and to consume the intermetallic-forming constituents and ceramic-forming constituents;

(d) recovering an intermediate material;

(e) mixing said intermediate material with a molten host metal in which said dispersoids are substantially insoluble, said host metal comprising metal, metal alloy, or intermetallic; and (f) recovering a product.

60. A method for dispersing second phase material in a metal, metal alloy or intermetallic, comprising adding a preformed intermediate material containing in-situ precipitated second phase material comprising an oxide, nitride, boride, carbide, silicide, sulfide or oxysulfide of a transition metal of the third to sixth groups of the Periodic Table, in an intermediate metal matrix, to molten host metal, metal alloy or intermetallic in which said dispersoids are substantially insoluble, mixing, and recovering a product containing the second phase material dispersed therein.

61. The method as set forth in claim 60, wherein the second phase material is formed by an exothermic reaction of second phase-forming constituents within a solvent metal.

62. The method as set forth in claim 61, wherein the second phase-forming constituents and the solvent metal are compressed to form a compact, followed by local initiation and subsequent propagation of the exothermic reaction through the compact.

63. A method for dispersing second phase material in a metal, metal alloy, or intermetallic, comprising admixing a preformed intermediate material containing in-situ precipitated second phase material, comprising an oxide, nitride, boride, carbide, silicide, sulfide or oxysulfide of a transition metal of the third to sixth groups of the Periodic Table in an intermediate metal matrix, with solid host metal, metal alloy, or intermetallic in which said dispersoids are substantially insoluble, heating to melt the host metal, mixing, and recovering a product containing the second phase material dispersed therein.

64. The method as set forth in claim 63 wherein the second phase material is formed by an exothermic reaction of second phase-forming constituents within a solvent metal.

65. The method as set forth in claim 64, wherein the second phase-forming constituents and the solvent metal are compressed to form a compact, followed by local initiation and subsequent propagation of the exothermic reaction through the compact:

66. A method for dispersing second phase material in a metal, metal alloy or intermetallic, comprising preforming an intermediate material containing insoluble second phase dispersoids, by exothermically reacting second phase forming constituents in the presence of a substantially nonreactive metal, adding thus formed intermediate material to molten host metal, metal alloy or intermetallic in which said dispersoids are substantially insoluble, mixing, and recovering a product containing the second phase material dispersed therein.

67. The method as set forth in claim 66, wherein the second phase-forming constituents and the solvent metal are compressed to form a compact, followed by local initiation and subsequent propagation of the exothermic reaction through the compact.

68. A method for dispersing second phase material in a metal, metal alloy, or intermetallic, comprising admixing a preformed intermediate material, containing insoluble second phase dispersoids in an intermediate metal matrix, prepared by the exothermic reaction of second phase forming constituents in the presence of a substantially nonreactive metal, with solid host metal, metal alloy, or intermetallic in which said dispersoids are substantially insoluble, heating to melt the host metal, mixing, and recovering a product containing the second phase material dispersed therein.

69. The method as set forth in claim 68, wherein the second phase-forming constituents and the solvent metal are compressed to form a compact, followed by local initiation and subsequent propagation of the exothermic reaction through the compact.

70. A method for the production of metal-second phase composite materials, the method comprising adding at least one in-situ precipitated second phase material in an intermediate metal matrix to a bath of molten host metal, metal alloy, or intermetallic in which said second phase is substantially insoluble, mixing, and recovering a product.

71. A method for the production of metal-second phase composite materials, the method comprising admixing at least one in-situ precipitated second phase material in an intermediate metal matrix with solid host metal, metal alloy, or intermetallic, heating until molten, and mixing, said second phase being substantially insoluble in said host metal.

72. A method for the production of metal-second phase composite materials, the method comprising adding an intermediate material, containing second phase particles produced by the exothermic reaction of reactive second phase-forming constituents in the presence of a substantially nonreactive metal, to a bath of a molten host metal, metal alloy, or intermetallic in which said second phase is substantially insoluble, mixing, and recovering a product.

73. The method as set forth in claim 1, wherein the molten host metal is aluminum, nickel, titanium, copper, vanadium, chromium, manganese, cobalt, iron, silicon, molybdenum, beryllium, platinum, niobium, tantalum, hafnium, zirconium, magnesium, lead, zinc, tin, tugsten, antimony, bismuth, or an alloy or intermetallic thereof.

74. The method as set forth in claim 73, wherein said molten host metal has a pre-existing second phase therein.

* * * * *